US006138117A

United States Patent [19]
Bayardo

[11] Patent Number: 6,138,117
[45] Date of Patent: Oct. 24, 2000

[54] METHOD AND SYSTEM FOR MINING LONG PATTERNS FROM DATABASES

[75] Inventor: Roberto Javier Bayardo, San Jose, Calif.

[73] Assignee: International Business Machines Corporation, Armonk, N.Y.

[21] Appl. No.: 09/069,677

[22] Filed: Apr. 29, 1998

[51] Int. Cl.[7] .................................................. G06F 17/30
[52] U.S. Cl. ................................ 707/6; 707/3; 707/101; 707/103
[58] Field of Search ................................. 707/6, 101, 3, 707/103; 705/10; 704/243

[56] References Cited

U.S. PATENT DOCUMENTS

| | | | |
|---|---|---|---|
| 5,465,353 | 11/1995 | Hull et al. ..................................... | 707/3 |
| 5,615,341 | 3/1997 | Agrawal et al. .......................... | 395/210 |
| 5,664,171 | 9/1997 | Agrawal et al. .......................... | 395/602 |
| 5,664,173 | 9/1997 | Fast ............................................. | 707/4 |
| 5,664,174 | 9/1997 | Agrawal et al. .......................... | 395/606 |
| 5,724,573 | 3/1998 | Agrawal et al. .......................... | 395/606 |
| 5,731,986 | 3/1998 | Yang ......................................... | 364/491 |
| 5,742,811 | 4/1998 | Agrawal et al. ............................. | 707/6 |
| 5,754,977 | 5/1998 | Gardner et al. .......................... | 704/243 |
| 5,764,974 | 6/1998 | Walster et al. ............................... | 707/6 |
| 5,794,209 | 8/1998 | Agrawal et al. ........................... | 705/10 |
| 5,794,239 | 8/1998 | Walster et al. ............................... | 707/6 |
| 5,819,266 | 10/1998 | Agrawal et al. ............................. | 707/6 |
| 5,845,285 | 12/1998 | Klein ...................................... | 707/101 |

OTHER PUBLICATIONS

R. Agrawal et al., "Database Mining: A Performance Perspective," IEEE Transactions on Knowledge and Data Engineering, vol. 5, No. 6, Dec. 1993, pp. 914–925.

R. Agrawal et al., "Fast Algorithims for Mining Association Rules," Proceedings of the 20th VLDB Conference, Santiago, Chile, 1994, pp. 487–499.

R. Agrawal et al., "Mining Association Rules between Sets of Items in Large Databases," Proceedings of the ACM–SIGMOD 1993 INt'l Conference on the Management of Data, Washington, DC, 1993, pp. 207–216.

R. Agrawal et al., "Mining Sequential Patterns," Proceedings of the Int'l Conference on Data Engineering, Taipei, Taiwan, 1995, pp. 3–14.

R.J. Bayardo, Jr., "Brute–Force Mining of High–Confidence Classification Rules," Proceedings of the 3rd Int'l Conference on Knowledge Discovery and Data Mining, California, 1997.

S. Brin et al., "Dynamic Itemset Counting and Implication Rules for Market Basket Data," Proceedings of the ACM SIGMOD Conference on Management of Data, 1997.

D. Gunopulos et al., "Discovering All Most Specific Sentences by Randomized Algorithms Extended Abstract," ICDT–97., 1997.

J. Han, "Discovery of Multiple–Level Association Rules from Large Databases," Proceedings of the 21st VLDB Conference, Zurich, Switzerland, 1995, pp. 420–431.

(List continued on next page.)

*Primary Examiner*—Thomas G. Black
*Assistant Examiner*—Frantz Coby
*Attorney, Agent, or Firm*—Khanh Q. Tran; Marc D. McSwain

[57] ABSTRACT

A method and apparatus for mining generally long patterns from a database of data records of items. An initial set C of candidates is first generated, each candidate c having disjoint sets of items c.head and c.tail. Frequent candidates from the set C are extracted and put into a set F, where the frequent candidates are those whose set {c.head ∪ c.tail} is an itemset having a minimum support. Non-frequent candidates in C are used to generate new candidates, which are added to the set C. After any candidates having a superset in the set F are removed from C and F, the method steps are repeated on the new candidate set C, until C is empty. The candidates remaining in the working set F are returned as the desired patterns.

33 Claims, 20 Drawing Sheets

OTHER PUBLICATIONS

M. Houtsman, "Set–Oriented Mining for Association Rules in Relational Databases," Proc. of the Int'l Conference on Data Engineering, Taipei, Taiwan, 1995, pp. 25–33.

D. Lin et al., "Pincer–Search: A New Algorithm for Discovering the Maximum Frequent Set," EDBT '98, Jun., 1998.

H. Mannila et al., "Improved Methods for Finding Association Rules," Pub. No. C–1993–65, University of Helsinki, 1993, pp. 1–20.

J.S. Park et al., "An Effective Hash–Based Algorithm for Mining Association Rules," Proceedings of the 1995 ACM SIGMOD Conference, San Jose, California, 1995, pp. 175–186.

J.S. Park et al., "Efficient Parallel Data Mining for Association Rules," IBM Research Report, RJ20156, Aug., 1995, 26 pages.

A. Savasere et al., "An Efficient Algorithm for Mining Association Rules in Large Databases," Proceedings of the 21st VLDB Conference, Zurich, Switzerland, 1995, pp. 432–444.

P. Smyth et al., "An Information Theoretic Approach to Rule Induction from Databases," IEEE Transactions on Knowledge and Data Engineering, vol. 4, No. 4, Aug. 1992, pp. 301–316.

R. Srikant et al., "Mining Association Rules with Item Constraints," Proceedings of the 3rd Int'l Conference on Knowledge Discovery in Databases and Data Mining, Oregon, 1996, pp. 67–73.

R. Srikant et al., "Mining Generalized Association Rules," Proceedings of the 21st VLDB Conference, Zurich, Switzerland, 1995, pp. 407–419.

R. Srikant et al., "Mining Sequential Patterns: Generalizations and Performance Improvements," IBM Research Report, RJ9994, Dec. 1995. Also in Proceedings of the 5th Conference on Extending Database Technology (EDBT) Avignon, France, 1996.

M.J. Zaki et al., "New Algorithms for Fast Discovery of Association Rules," Proceedings of the 3rd Int'l Conference on Knowledge Discovery and Data Mining, California, Aug. 1997, pp. 283–286.

FIG. 3

MAX-MINER(Set of Itemsets $T$)
;; Returns the set of maximal frequent itemsets present in $T$
Set of Candidates $C \leftarrow \{\}$
Set of Itemsets $F \leftarrow \{\text{GENERATE-INITIAL-CANDIDATES}(T, C)\}$
while $C$ is non-empty do
    scan $T$ to count the support of all candidates in $C$
    for each frequent candidate $c$ in $C$ do
        $F \leftarrow F \cup \{c.\text{head} \cup c.\text{tail}\}$
    Set of Candidates $C_{new} \leftarrow \{\}$
    for each infrequent candidate $c$ in $C$ do
        $F \leftarrow F \cup \text{GENERATE-NEW-CANDIDATES}(c, C_{new})$
    $C \leftarrow C_{new}$
    remove from $F$ any itemset that has a proper superset in $F$
    remove from $C$ any candidate $c$ such that $c.\text{head} \cup c.\text{tail}$ has a superset in $F$
return $F$

FIG. 5

GENERATE-INITIAL-CANDIDATES(Set of Itemsets $T$, Set of Candidates $C$)
;; $C$ is passed by reference and modified to contain the initial set of candidates
;; Returns a frequent 1-itemset
scan $T$ to obtain $F_1$, the set of frequent 1-itemsets
impose an ordering on the items in $F_1$
for each item $i$ in $F_1$ other than the greatest item do
    let $c$ be a new candidate with $c.head = \{i\}$ and $c.tail$ empty
    for each item $j$ in $F_1$ following $i$ in the ordering do
        $c.tail \leftarrow c.tail \cup \{j\}$
    $C \leftarrow C \cup \{c\}$
let $m$ denote the greatest item in $F_1$
return $\{m\}$

FIG. 7

GENERATE-NEW-CANDIDATES(Candidate $c$, Set of Candidates $C$)
:; $C$ is passed by reference and modified to contain candidates generated from infrequent candidate $c$
:; Returns a frequent itemset
for each frequent tail item $i$ in $c$.tail in increasing item order do
    let $c'$ be a new candidate with $c'$.head = $c$.head $\cup$ $\{i\}$ and $c'$.tail empty
    for each frequent tail item $j$ in $c$.tail that follows $i$ in the ordering do
        $c'$.tail $\leftarrow$ $c'$.tail $\cup$ $\{j\}$
    if $c'$.tail is empty
        then return $c'$.head
        else $C \leftarrow C \cup \{c'\}$

FIG. 8

GENERATE-NEW-CANDIDATES(Candidate $c$, Set of Candidates $C$)
;; $C$ is passed by reference and modified to contain candidates generated from infrequent candidate $c$
;; Returns a frequent itemset
impose a new ordering on the frequent tail items of $c$
for each frequent tail item $i$ in $c$.tail in increasing item order do
    let $c'$ be a new candidate with $c'$.head = $c$.head $\cup$ {$i$} and $c'$.tail empty
    for each frequent tail item $j$ in $c$.tail that follows $i$ in the ordering do
        $c'$.tail $\leftarrow$ $c'$.tail $\cup$ {$j$}
    if COMPUTE-LOWER-BOUND($c'$, $c$.head) $\geq$ minsup
        then return $c'$.head $\cup$ $c'$.tail
        else $C \leftarrow C \cup \{c'\}$

FIG. 9

COMPUTE-LOWER-BOUND(Candidate $c$, Itemset $I$)
;; Returns an integer that lower-bounds the support of candidate $c$
;; Itemset $I$ is the head of the candidate that generated $c$
Integer $d \leftarrow 0$
for each item $i$ in $c$.tail do
　　$d \leftarrow d + \text{drop}(I, i)$
return $\sup(c.\text{head}) - d$

METHOD AND SYSTEM FOR MINING LONG PATTERNS FROM DATABASES

FIELD OF THE INVENTION

The present invention generally relates to data processing, and more particularly, to a method and system for mining long frequent patterns from databases in which the performance scales generally linearly with the length of the longest patterns.

BACKGROUND OF THE INVENTION

Finding frequent patterns in databases is a fundamental operation behind several common data-mining tasks including association-rule and sequential-pattern mining. An example of association-rule data mining is the Apriori method described by Agrawal et al. in U.S. patent application for "System and Method for Quickly Mining Association Rules In A Database," Ser. No. 08/415,006. Sequential-pattern data mining is described, for example, by Srikant et al. in U.S. Pat. No. 5,742,811 for "Method for Mining Generalized Sequential Patterns In A Large Database." For the most part, frequent-pattern mining methods have been developed to operate on databases in which the longest frequent patterns are relatively short, e.g., those with less than 10 items. A prototypical application of frequent-pattern mining is market-basket analysis, where the goal is to identify store items that are frequently purchased together. It is unusual for the frequent patterns in these databases to contain more than 10 items because most people purchase relatively few items at a time, and due to the variety of items available, shopping habits can be quite diverse. There is a wealth of data that does not fit the mold of retail data, yet remains ripe for exploration through frequent-pattern mining techniques.

Two recent papers investigated the application of association-rule miners to such data. In the first paper entitled "Dynamic Itemset Counting and Implication Rules for Market Basket Data," Proc. of the 1997 SIGMOD Conf. on the Management of Data, pp. 255–264, Brin et al. applied their association-rule miner to a database compiled from census records. In the second paper, "Brute-Force Mining of High-Confidence Classification Rules," Proc. of the Third Int'l Conf. on Knowledge Discovery and Data Mining, pp. 123–126, Bayardo investigated the use of an association rule miner to mine classification rules from commonly used classification benchmarks in the Irvine Machine Learning Database Repository (available on the World Wide Web at http://www.ics.uci.edu/~mlearn/MLRepository.html).

A common finding of these papers is that previously developed methods for mining associations from retail data are inadequate on complex data sets. Brin et al. had to remove all items from their data set appearing in over 80% of the transactions, and even then could only mine efficiently at high SUPPORT levels. The support of an item is defined as the number of data sequences in the database that contain the item. Bayardo had to apply several additional pruning strategies beyond those in typical association rule miners, several of which rendered the search incomplete. The difficulty of these data sets results from a long average record length (more "items" per "transaction" than in retail sales data) and the characteristic that many items appear with high frequency. Data sets used for classification tend to have these qualities. Other examples include questionnaire results (people tend to answer similarly to many questions), retail sales data involving complex system configurations or where purchases across a large time window are compiled into a single transaction, and biological data from the fields of DNA and protein analysis.

Almost every recently-proposed method for mining frequent patterns is a variant of the Apriori method. When the size of frequent patterns is small, Apriori uses a bottom-up search-space pruning strategy that is very effective. The strategy exploits the fact that a pattern can be frequent if and only if every one of its sub-patterns is frequent. A pattern is called FREQUENT if the items in the pattern appear together in the database with a defined regularity (or a minimum support specified by the user). By considering patterns only when their sub-patterns have been determined to be frequent, the number of patterns that turn up infrequent, yet are still "checked" against the database, is kept to a minimum. Unfortunately, this approach is fundamentally intractable for mining long patterns simply because the number of sub-patterns of a pattern grows exponentially with pattern length. For example, the number of patterns that must be considered to generate a length l association rule is $2^l$.

There are many variants of Apriori that differ primarily in the manner by which patterns are checked against the database. Apriori in its purest form checks patterns of length l during database pass l. Brin et al.'s method is more eager and begins checking a pattern for frequency shortly after all its subsets have been determined frequent, rather than waiting until the database pass completes. In a paper entitled "An Efficient Algorithm for Mining Association Rules in Large Databases," Proc. of the 21st Conf. on Very Large Data-Bases, pp. 432–444, Savasere et al. describe a method that identifies all frequent patterns in memory-sized partitions of the database, and then checks these against the entire database during a final pass. Brin et al.'s method considers the same number of "candidate" patterns as Apriori, and Savasere et al.'s method can consider more (but never fewer) candidate patterns than Apriori, potentially exacerbating problems associated with long frequent patterns.

Still another variant of Apriori, described by Park et al. in "An Effective Hash Based Algorithm for Mining Association Rules," Proc. of the 1995 SIGMOD Conf. on the Management of Data, pp. 175–186, enhances it with a hashing scheme that can identify (and thereby eliminate from consideration) some candidates that will turn up infrequent if checked against the database. It also uses the hashing scheme to re-write a smaller database after each pass in order to reduce the overhead of subsequent passes. Still, like Apriori, it checks every sub-pattern of a frequent pattern.

In a paper entitled "Discovering All Most Specific Sentences by Randomized Algorithms," Proc. of the 6th Int'l Conf. on Database Theory, pp. 215–229, 1997, Gunopulos et al. present a randomized method for identifying maximal frequent patterns in memory-resident databases. The method is purely greedy, iteratively attempting to extend the length of a working pattern without examining all its sub-patterns. An incomplete (in the sense that it provides no guarantee that all maximal frequent patterns will be found) version of the method is evaluated and found to efficiently extract long maximal frequent patterns. Unfortunately, it is not clear how this method would be scaled to disk resident data sets, nor is it clear how the proposed complete version would perform.

Zaki et al. present two methods for identifying maximal frequent-patterns, namely, MaxEclat and MaxClique, in the paper entitled "New Algorithms for Fast Discovery of Association Rules," Proc. of the Third Int'l Conf. on Knowledge Discovery in Databases and Data Mining, pp. 283–286. These methods attempt to look ahead and identify long patterns early on to help prune the space of patterns considered. Though MaxEclat and MaxClique are demonstrated to be advantageous on random data with short maximal patterns, they are still prone to performance problems on data sets with long patterns. Both MaxEclat and MaxClique identify coarse clusters of potentially frequent patterns early on in the search. Due to cluster inaccuracies, they identify only a single maximal pattern per cluster, and afterwards employ a purely bottom-up approach. Though the set of candidates considered can be reduced, due to the Apriori-like bottom-up phase, both methods still scale exponentially with pattern length. The cluster identification phase of MaxEclat also scales exponentially with pattern length since it uses a dynamic programming algorithm for finding maximal cliques in a graph whose largest clique is at least as large as the length of the longest pattern.

Therefore, there is still a need of a method for efficiently mining long patterns from databases that is orders of magnitude faster at mining long maximal-patterns than Apriori-like algorithms, scales roughly linearly in the number of maximal patterns rather than exponentially in the length of the longest patterns, and in which the number of database passes remains bounded by the length of the longest pattern.

SUMMARY OF THE INVENTION

It is an object of the present invention to provide an efficient method for extracting relatively long frequent patterns from a database of transaction records where each record includes several data items.

It is another object of the present invention to provide a method for mining long patterns that "looks ahead" into the search space, instead of traversing it in a bottom-up fashion, in order to quickly identify long patterns.

It is still another object of the present invention to quickly identify those patterns that are both frequent and maximal so that the set of maximal frequent patterns represents the set of all frequent patterns.

The present invention achieves the foregoing and other objects by providing a method for identifying patterns from a database of records including the steps of: (1) generating an initial set C of candidates where each candidate c includes two distinct sets of items: c.head and c.tail; (2) determining a support for each candidate in C; (3) extracting frequent candidates from the set C and putting them into a working set F, where the frequent candidates are those whose set {c.head ∪ c.tail} is an itemset having the minimum support; (4) generating new candidates from non-frequent candidates of C using a lower-bounding of candidate support and replacing the non-frequent candidates of C with the new candidates; (5) removing from the sets C and F any candidates that have a superset in F; and (6) repeating steps (2–5) until the set C of candidates is empty. The remaining candidates in F are returned as the desired patterns.

The generation of the set C of initial candidates preferably includes determining a set $F_1$ of frequent 1-itemsets and ordering the items in $F_1$ in an increasing order of support. For each item i in $F_1$ other than the last item in the order, a new candidate is created with {i} as c.head and all other items following i in the order as c.tail. The new candidate is added to the set C.

The generation of new candidates from a nonfrequent candidate c preferably includes: (a) ordering the items in the set c.tail-of c in an increasing order of support; and (b) for each item i in the set c.tail and in the increasing item order: i) creating a candidate c' where c'.head is c.head ∪ {i} and c'.tail includes all items that follow i in the order; ii) computing a support lower bound for the itemset {c'.head ∪ c'.tail}; and ii) if the lower bound is equal to or greater than the minimum support, then returning the itemset {c'.head ∪ c'.tail} as a frequent itemset, otherwise, adding the candidate c' to the set C. The computation of a support lower bound includes, for each item i in the set c'.tail: extending the set c.head (l) with the item i, and computing an upper bound of support drop resulting from adding the item i to any itemset that is a superset of the set l. The support drops resulting from extending the set c'.head with every item in the set c'.tail are subtracted from the support of the c'.head itemset. This result is the lower bound of support for the itemset {c'.head ∪ c'.tail}.

In addition, to quickly determine the support of each candidate, the candidates are stored in a hash tree in which they are indexed using the items in the c.head itemsets. For each data record, the hash tree is traversed to look up all candidates whose itemsets c.head appear in the record. For each candidate that is identified, its tail items in the hash tree are traversed. The support of each item that appears in the record is incremented by one. Additional constraints may also be imposed on the patterns to be extracted, such as finding only the longest patterns.

Additional objects and advantages of the present invention will be set forth in the description which follows, and in part will be obvious from the description or may be learned from the practice of this invention. The objects of the invention as described herein may be realized and obtained by means particularly pointed out and distinctly claimed in the appended claims taken in conjunction with the accompanying drawings and detailed specification.

BRIEF DESCRIPTION OF THE DRAWINGS

FIG. 3 shows the pseudo-code for a preferred embodiment of the Max-Miner method for mining long patterns.

FIG. 5 shows the pseudo-code for a preferred embodiment of the Generate-Initial-Candidates function, which is part of the basic Max-Miner method.

FIG. 7 shows the pseudo-code of one preferred implementation of the Generate-New-Candidates operation shown in FIG. 6.

FIG. 8 shows the pseudo-code for another preferred embodiment of the Generate-New-Candidates operation, with item-reordering and support lower-bounding optimizations.

FIG. 9 shows the pseudo-code for a typical calculation of the support lower-bound for a candidate.

DESCRIPTION OF THE PREFERRED EMBODIMENTS

The invention will be described primarily in terms of a method for mining long patterns from a large database. However, persons skilled in the art will recognize that a computing system, which includes suitable programming means for operating in accordance with the method to be disclosed, also falls within the spirit and scope of the invention. In addition, the invention may also be embodied in a computer program product, such as a diskette, for use with a suitable data processing system. Programming means is also provided for directing the data processing system to execute the steps of the method of the invention, as embodied in the program product.

Figure 1:
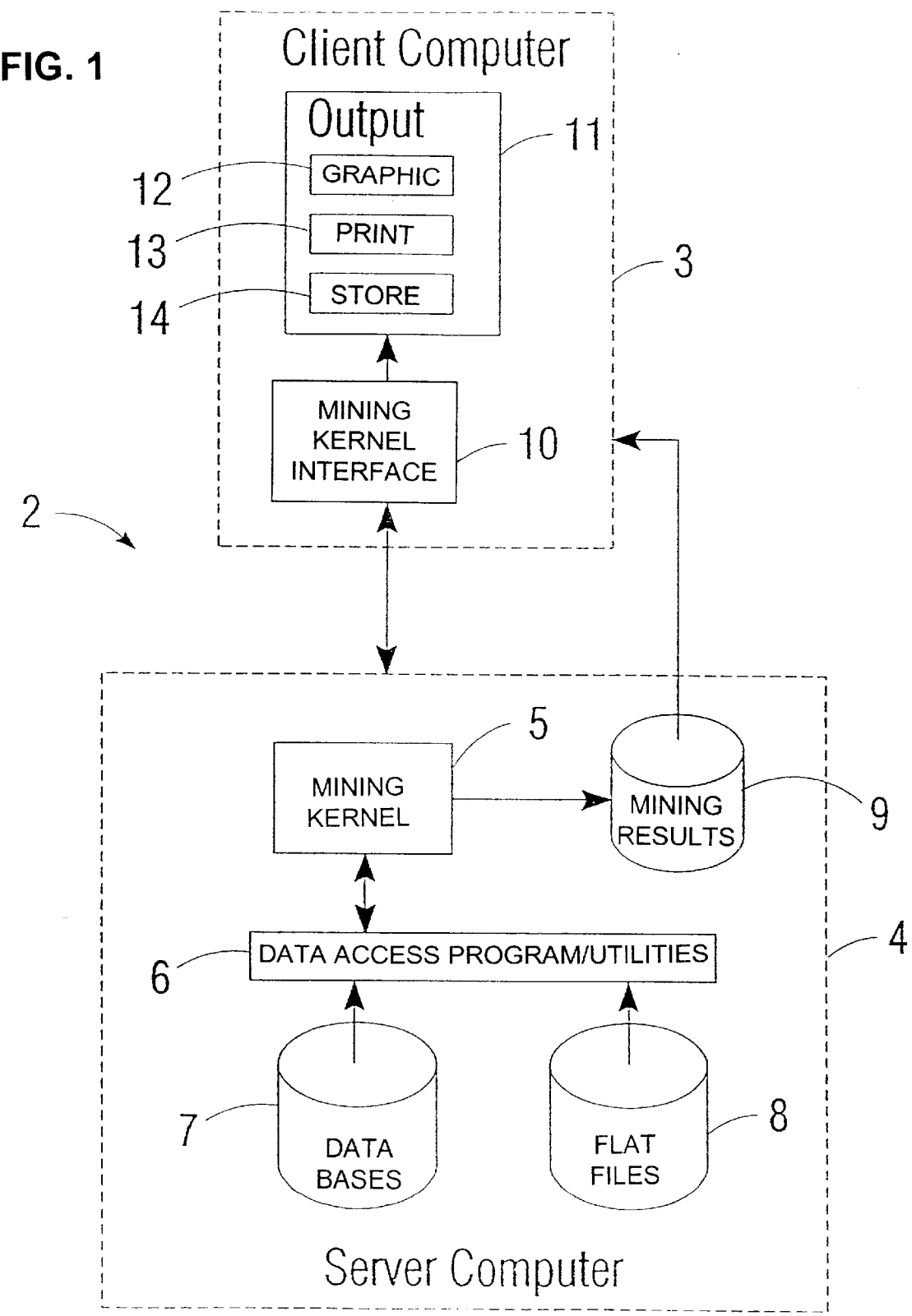
FIG. 1 is a simplified block diagram of the system in which the method of mining long patterns, in accordance with the invention, may be practiced.

FIG. 1 is a simplified block diagram of a typical computing system 2 in which the method of the invention may be practiced. In FIG. 1, the system 2 includes one or more data processing apparatus, such as a client computer 3 and a server computer 4. In one intended embodiment, the server computer 4 may be a mainframe computer made by IBM Corp., and use an operating system such as one marketed by IBM Corp. under the name MVS. Alternatively, the server computer 4 may be an IBM RS/6000 workstation running version 3.2.5 of the IBM AIX operating system. The server computer 4 may have a database system such as IBM DB2, or it may have data stored as data files, i.e., flat files, in a data storage medium such as a diskette, disk, or tape. It is to be understood that architectures other than the one shown may be used. For example, the functions of the client computer 3 may be incorporated into the server computer 4, and vice versa.

As shown, the operating system of the server computer 4 includes a mining kernel 5 which may be executed by a processor within the server computer 4 as a series of computer-executable instructions. These instructions may reside, for example, in the RAM of the server computer 4. Alternatively, the instructions may be contained on a data storage device with a computer readable medium, such as a computer diskette, a DASD array, magnetic tape, optical storage device, or other suitable data storage devices. As an illustrative embodiment, the instructions may be implemented in the C++ computer programming language.

FIG. 1 shows that, through appropriate data access programs and utilities 6, the mining kernel 5 accesses one or more databases 7 or flat files 8 which contain data transactions. After performing the mining operations in accordance with the invention as described below, the mining kernel 5 outputs patterns it discovers to a mining results depository 9, which can be accessed by the client computer 3.

Additionally, FIG. 1 shows that the client computer 3 can include a mining kernel interface 10 which, like the mining kernel 5, may be implemented in suitable computer code. Among other things, the interface 10 functions as an input mechanism for establishing certain variables, including the values of the minimum support and time-gap constraints as defined below. Further, the client computer 3 preferably includes an output device 11 for outputting or displaying the mining results. As shown, the output device 11 may include a display monitor 12, a printing device 13, or a data storage medium 14.

A method for identifying all frequent patterns in complex data sets in accordance with the invention, referred to as Max-Miner, is now described. Max-Miner can quickly identify those patterns that are both frequent and MAXIMAL in the sense that no super-pattern of the pattern is also frequent. Because any frequent pattern must be a sub-pattern of a maximal frequent pattern, the-set of maximal frequent patterns implicitly represents the set of all frequent patterns. Unlike other methods for identifying maximal frequent patterns such as those discussed earlier, Max-Miner places no limitations on the size of the data set, nor does it exhibit scaling that is exponential in the length of the longest pattern. Max-Miner is thus distinguished from the above-discussed MaxEclat and MaxClique methods in that it continuously attempts to identify long maximal patterns throughout the search rather than only during an initial phase. In effect, Max-Miner continuously "refines" pattern clusters so that maximal frequent patterns can be efficiently found without resorting to any bottom-up traversal of the pattern space.

The Max-Miner method is shown to result in two or more orders of magnitude in performance improvements over Apriori on data sets with relatively long patterns (e.g., those with generally more than 10 items). In practice, Max-Miner is demonstrated to run in time that is roughly linear in the number of maximal frequent itemsets and the size of the database, irrespective of the size of the longest pattern. The space requirement of Max-Miner is found to be roughly linear in the number of maximal frequent itemsets. Contrast this to Apriori, which is exponential in time and space (both in theory and in practice) in the size of the longest frequent pattern.

Max-Miner is efficient because it abandons strict bottom-up traversal of the search space, and instead always attempts to "look ahead" in order to quickly identify long patterns. By identifying a long pattern early on, Max-Miner can prune all its sub-patterns from consideration. Max-Miner uses a powerful heuristic to guide its search through the space of frequent patterns. It also uses a technique that lower-bounds the number of database records containing a particular pattern. This technique allows Max-Miner to often determine when a pattern is frequent without even looking at the database. In addition, Max-Miner can incorporate additional pattern constraints. A variant of Max-Miner will also be described that identifies only the longest of the maximal frequent patterns in a database. This method efficiently identifies all of the longest maximal frequent patterns even when the space of all maximal frequent patterns is itself intractably large.

BASIC MAX-MINER FREQUENT-PATTERN-MINING METHOD

The operation of a basic Max-Miner method on an example data set is first described in detail. Next, a formal description of Max-Miner, proof of its correctness, and an established bound on the number of database passes it performs will be presented. Finally, several optimizations that improve the performance of the method considerably, yet are not essential to explaining the fundamental operation of the basic method, will be discussed.

Consider the data set in Table 1 in which each row represents a database record. Suppose that each integer in the database records represents some item from a store, and each record represents a shopping transaction (the list of items purchased at the same time by a customer).

TABLE 1

1, 2, . . . , 20
1, 2, . . . , 20
. . .
1, 2, . . . , 20
21, 22, . . . , 40
21, 22, . . . , 40
. . .
21, 22, . . . , 40

This obviously contrived example data set then consists of only two different types of transactions, each containing exactly 20 items distinct from the other. Assume that exactly half of the data set is composed of each type, and that FREQUENT ITEMSETS are being identified as patterns. Frequent itemsets are those sets of items that appear together in a number of transactions above or equal to a minimum SUPPORT (minsup) specified by the user. An itemset with k items is called a k-itemset. The support of an itemset is the number of transactions that contain the itemset. For ease of explanation, but without any limitation intended thereby, from here on the invention will be described in the context of identifying frequent itemsets. The application of the method and system of the invention for finding other frequent patterns (e.g. sequential patterns) is similar.

If the Apriori method (described in U.S. Pat. Ser. No. 08/415,006) were used, a pure bottom-up approach for identifying frequent itemsets and counting the support of candidate itemsets of length k during database pass k would be applied. Apriori would make a k-itemset a candidate itemset if every one of its (k−1)—item subsets was found to be frequent. The set of candidate itemsets considered by Apriori during pass k is denoted as $C_k$, and the set of frequent itemsets in $C_k$ is denoted as $F_k$. Apriori terminates when it reaches a level where $C_k$ is empty. Given the example data set as input, $F_k$ contains every k-item subset of {1, 2, . . . , 20} and {21, 22, . . . , 40}, and $C_k$ is identical to $F_k$ for k>2. This means $C_k$ is non-empty until k=21. Apriori thus produces and counts the support of every subset of {1, 2, . . . , 20} and {21, 22, . . . , 40}, and requires 20 passes over the database (i.e., the maximum number of items in the records).

Before the Max-Miner method of the invention is described further, some additional terminology is now introduced. Max-Miner represents a CANDIDATE (not to be confused with Apriori's candidate itemsets) as two distinct sets of items called the head and tail of the candidate. The head itemset and the tail itemset from a candidate c are denoted as c.head and c.tail, respectively. The candidate itself will be denoted as $\{h_1, h_2, \ldots, h_j[t_1, t_2, \ldots, t_k]\}$ where $h_1, h_2, \ldots, h_j$ are the items from c.head and $t_1, t_2, \ldots, t_k$ are the items from c.tail, respectively. When counting the SUPPORT of a candidate c, Max-Miner counts the support of itemset-c.head ∪ c.tail along with all itemsets c.head ∪ {i} such that i ∈ c.tail. A candidate c is said to be FREQUENT if c.head ∪ c.tail is a frequent itemset. A tail item i of a candidate c is FREQUENT if c.head ∪ {i} is a frequent itemset. For example, given the candidate {1[2, 3, . . . , 40]} and the example data set, tail items 2 through 20 are frequent, tail items 21 through 40 are infrequent, and the candidate itself is infrequent.

Figure 2:
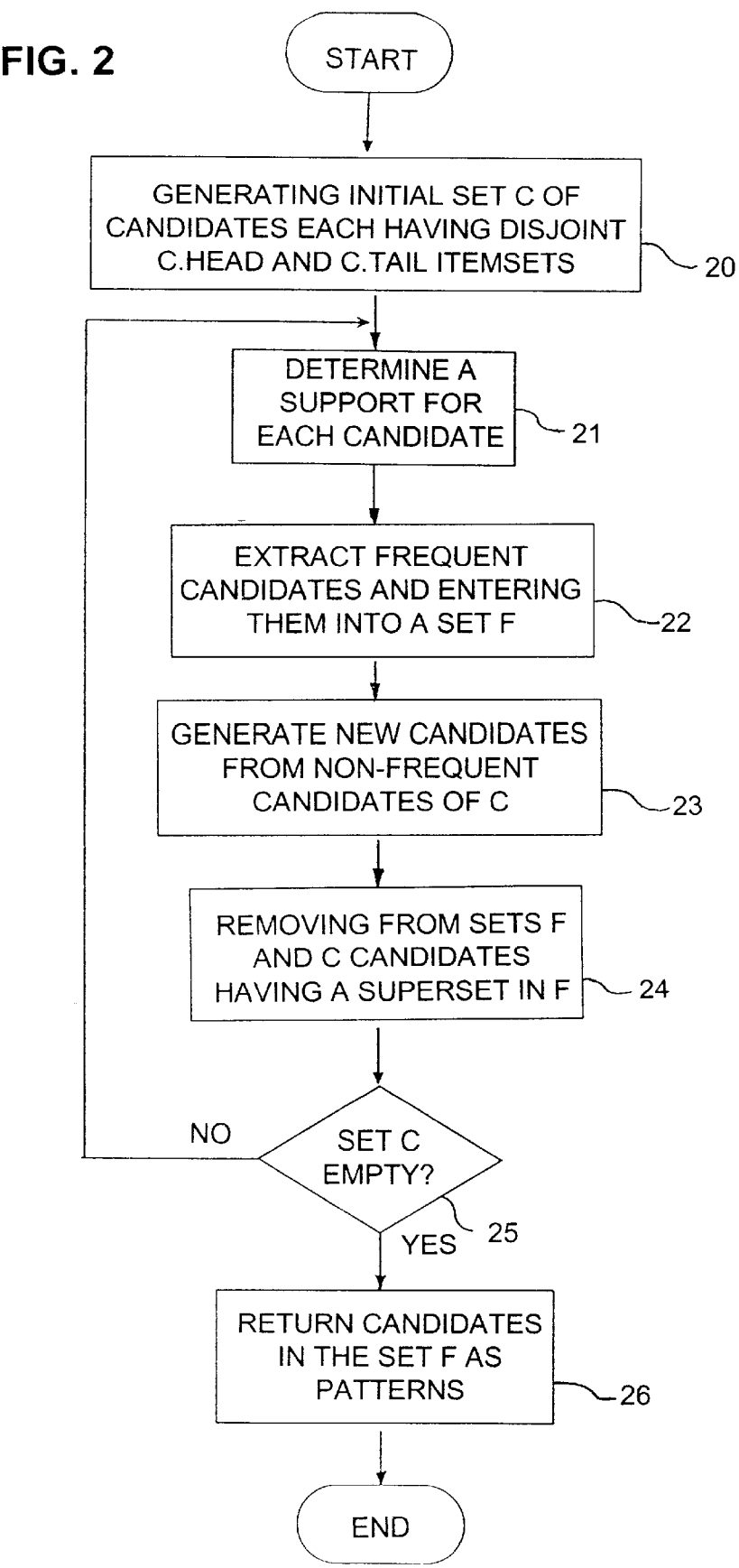
FIG. 2 is a flowchart representing the general operation of the basic (Max-Miner) method for mining long patterns, in accordance with the invention.

FIG. 2 is a flowchart representing the operational sequence of the method of the invention. At step 20, an initial set C of candidates is generated where each candidate c includes two distinct sets of items c.head and c.tail. This step will be described in detail below in reference to FIGS. 4–5. At step 21, a support for each candidate in the set C is determined. The support of a set of items (i.e., the support of an itemset) is the number of transactions (records) in the database that contain this itemset. The support of an candidate c is counted as the support of the itemset c.head ∪ c.tail along with all itemsets c.head ∪ {i} such that i ∈ c.tail. At step 22, frequent candidates in set C are extracted and put into a working set F. A candidate c is frequent if the items in the set {c.head ∪ c.tail} appear together in a number of transactions above or equal to a minimum support (minsup) specified by the user. New candidates are next generated from the non-frequent candidates of the set C at step 23. At step 24, the candidates having a superset in F are removed from the working sets C and F. The above steps 21–24 are repeated until the set C is empty, as determined by block 25. When C is empty, the candidates remaining in the set F are returned as the desired patterns, at step 26.

Max-Miner initializes a working set of candidates C and a working set of frequent itemsets F from the set of frequent 1-itemsets $F_1$. It requires an ordering of the items within a data set. For now, assume that the ordering of the items is lexicographic. For the example database above, the initial set of candidates C would consist of the following:

{1[2, 3, . . . , 40]}

{2[3, 4, . . . , 40]}

. . .

{39[40]}

The itemset F is made to contain only the 1-itemset with the greatest frequent item along the item ordering. Given the above example data set, the set F is equal to {{40}} immediately following initialization.

The above steps are repeated until the working set of candidates C is empty. Within each iteration, the method first makes a database pass to count the support of all candidates in C. Afterwards, it puts any frequent candidates in F while taking care to remove from F any sets that have a proper superset in F (step 24 ). For example, the initial candidate {21[22, 23, . . . , 40]} will turn up frequent in the above example, and hence itemset {21, 22, . . . , 40} will be put in F, and {40} removed from F.

Each infrequent candidate in C is then used to generate a new set of candidates to be counted during the next database pass. For an infrequent candidate c, the method forms a new candidate whose head is c.head ∪ {i}, and whose tail is all frequent tail items in c that follow i in the item ordering. From this example, given the infrequent candidate {1[2, 3, . . . , 40]} with frequent tail items 2 through 20, Max-Miner produces the following new candidates:

{1, 2[3, 4, . . . , 20]}

{1, 3[4, 5, . . . , 20]}

. . .

{1, 20[]}

The candidates generated from each infrequent candidate are gathered together to form the new working set of candidates C, excepting those with empty tails. Candidates with empty tails are known to be frequent, so they are put directly into F so long as they do not have a superset already present in F. Before making a database pass to count the support of the new set of candidates, Max-Miner removes any candidate whose head and tail combined form an itemset with a superset in F (since we know it will turn up frequent). If the set of candidates C ever turns up empty after this step, the loop terminates and F is returned as the set of maximal frequent itemsets.

Continuing this example, the next (third) database pass will count the support of several candidates including {1, 2[3, 4, . . . , 20]} which will be found to be frequent and put in F. The next set of candidates C, after purging those candidates that have supersets in F, will be empty. The method thus halts after three database passes, and F (containing only {1, 2, . . . , 20} and {21, 22, . . . , 40}) is returned as the set of maximal frequent itemsets. While the Apriori method required 20 passes over the example data set and counted the support of over $2 \cdot 2^{20}$ itemsets in order to discover these 2 longest patterns, Max-Miner requires only 3 passes over the database and counts the support of a number of candidates that is quadratic in the size of $F_1$.

Formalizing Max-Miner

FIG. 3 shows the pseudo-code for a preferred embodiment of the just-described basic Max-Miner method. Max-Miner accepts as input a database T and, implicitly, the minimum support specified by the user. It first initializes the working set of candidates C and the set of maintained frequent itemsets F using the function Generate-Initial-Candidates. The pseudo-code for a preferred embodiment of the Generate-Initial-Candidates function is shown in FIG. 5. Initialization performs the initial database pass to identify the set of frequent 1-itemsets $F_1$, imposes an ordering on the items found to be frequent, and then generates exactly $|F_1|-1$ candidates before returning a single frequent 1-itemset. Each of these initial candidates has exactly one item in its head, and every item from $F_1$ that follows the head item in the ordering appears in its tail.

Following initialization, Max-Miner enters a loop that continues until the working set of candidates is empty. After first counting the support of candidates in C, any frequent candidates are moved into F and infrequent candidates are used to generate the next working set of candidates. Candidate generation is performed by the function Generate-New-Candidates, as shown by the pseudo-code in FIG. 4. The Generate-New-Candidates operation accepts an infrequent candidate c and generates one new candidate for each frequent tail item in c.tail. All but the last candidate generated, which is returned as a frequent itemset because it has an empty tail, are collected into what will become the next working set of candidates.

The number of database passes performed by Max-Miner is bounded by one greater than the number of items in the longest frequent itemset, rather than by the maximum number of items in the records as for the Apriori case. As shown later in the specification, Max-Miner usually performs less database passes than this bound in practice when the longest frequent itemsets are more than 10 in length. On the other hand, the number of data passes for Apriori is always within one of the bound. Although there are several methods for reducing the number of database passes performed by "plain vanilla" Apriori (e.g., the method described in the Savasere et al. reference), they are usually at the expense of considering additional candidate itemsets.

In addition, the Max-Miner method of the invention makes at most l±1 passes over the database T. where l denotes the number of items in the longest frequent itemset. This can be shown by demonstrating that Max-Miner terminates after database pass (l+1) if it happens to get that far. In the process in which Max-Miner generates candidates, it can be seen that during database pass $k_1$ the head of any candidate has exactly (k-1) items. If Max-Miner completes database pass l and generates a non-empty candidate set, these candidates will contain exactly l items in their head. Note that all tail items in these candidates will be found to be infrequent after database pass (l+1) since there is no frequent itemset longer than l. Because there are no frequent tail items from which new candidates can be generated, the next candidate set will be empty and the method terminates.

Next, it can be shown that Max-Miner can find all maximal frequent itemsets from the data set, and that Max-Miner is a constructive procedure for generating some frequent superset of any given frequent itemset. During the course-of Max-Miner's execution, any frequent k-itemset l will end up as a subset of some itemset in F. This can be established by examining how Max-Miner generates a frequent candidate that contains any given frequent k-itemset l. Let $i_1$ denote the first item in l according to the item ordering, $i_2$ the second, and so on. Now consider the candidate c produced by the Generate-lnitial-Candidates function with $\{i_1\}$ as its head. If there is no such candidate, then $i_1$ must be the last item in the ordering. If there is such a candidate, then clearly all items from l-{i} are in c.tail.

After the database pass counting the support of this candidate, if c is found to be frequent, then the above observation about the frequent k-itemset l holds true. Otherwise, all the items in l-{i} will be frequent tail items in c. The Generate-New-Candidates function will therefore produce from c, among others, a new candidate containing $i_1$ and $i_2$ as its head, and $i_3$, . . . , $i_k$ in its tail. This process can be applied iteratively to show that eventually a frequent candidate containing $i_1$. . . . , $i_k$ will be found (in which case the observation holds), or $i_1$, . . . , $i_k$ will end up as the head of some candidate. If $i_1$, . . . , $i_k$ ends up as the head of some candidate, then Max-Miner will continue generating candidates with heads that are supersets of $i_1$, . . . , $i_k$ at least until one is found to be frequent and put in the itemset F.

It is also noted that Max-Miner returns only and all the maximal frequent itemsets in database T. Since Max-Miner does not remove any set from itemset F unless a proper superset of it already exists in F, every frequent itemset has a superset in the returned set F upon termination of the method. This implies that all maximal frequent itemsets must appear in F. Further, because sets with proper supersets in Fare always removed from it, the returned set F must contain only the maximal frequent itemsets.

Optimization Details

In the previous sections, a basic Max-Miner method for mining long patterns from databases was described. In practice, additional optimizations are included in the preferred embodiment of the invention to improve its performance on real-world data sets. Because these optimizations do not fundamentally change how Max-Miner traverses the pattern space, its basic operation and efficiency still hold.

The primary performance problem stems from a combinatorial explosion in candidates that are generated. An infrequent candidate c with t frequent tail items will generate t new candidates to be considered during the next database pass. This section first presents a method for controlling this combinatorial explosion based on ordering and reordering the items within candidate tails. Next, a scheme that lower-bounds candidate support is described which further reduces the amount of candidates Max-Miner must consider. Lastly, a method for initializing Max-Miner from $F_2$ instead of $F_1$, as well as how Max-Miner's support counting and subset removal operations can be implemented efficiently with Apriori's data-structures, will be described.

1. Item Reordering

The optimization used for controlling candidate explosion involves coming up with a good initial ordering of the items, and also dynamically re-ordering items in each candidate tail individually after each database pass. Items appearing first in the ordering will appear in the heads of the candidates with the longest tails. Since the candidates with the most frequent tail items contribute most to the candidate explosion, the item ordering is chosen so that the candidates with long tails have a high probability of having many infrequent tail items. A good way to accomplish this is to ensure that the candidates with the longest tails have heads with as low support as possible, thereby increasing the probability that tail item support will be below minsup.

Before generating the initial set of candidates, the items are sorted in an increasing order of support as determined while computing $F_1$. This ensures that within the initial candidate set C, a candidate that has a longer tail than another candidate also has a head with lower support. Next, before generating new candidates from an infrequent candidate c, its tail items are sorted in an increasing order of tail-item support, where the support of tail-item i is the support of c.head $\cup$ {i}. Among candidates generated from c, this policy ensures that if one candidate has a longer tail than another, then it also has lower head support.

Figure 4:
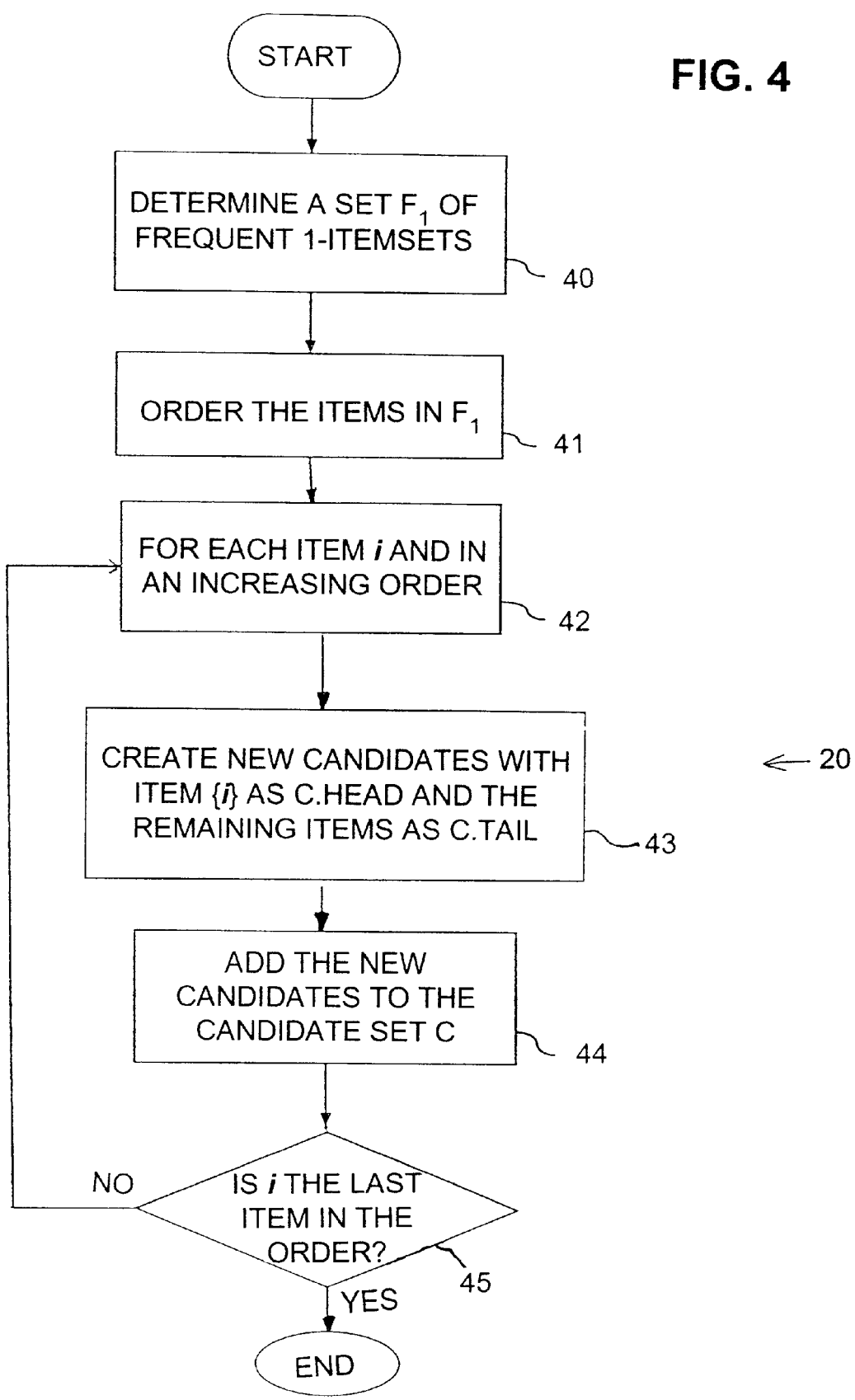
FIG. 4 is a flowchart representing a preferred embodiment of the sequence of generating the initial set of candidates in accordance with the invention.

FIG. 4 is a flowchart showing the operational sequence of a preferred embodiment for the generation of the initial candidates set (step 20 of FIG. 2). At step 40, a set $F_1$ of frequent 1-itemsets from the data records. 1-itemsets are those that contain exactly one item. The items in set F. are ordered at step 41. For each item i of the set $F_1$ and in an increasing item order, new candidates are created with the item {i} as c.head and the remaining items in the order as c.tail (steps 42–43). The new candidates are added to the candidate set C in step 44. If i is the last item in the order (step 45), the process of generating initial candidates terminates, otherwise, it reiterates starting with step 42. FIG. 5 shows the pseudo-code for a typical implementation of the generation of the initial set of candidates.

2. Support Lower-Bounding

Another desired optimization is for reducing the number of candidates considered with each database pass is a technique that lower-bounds the support of a candidate before its support is explicitly counted. If the lower-bound on the support of a candidate is greater than minsup, Max-Miner can dump the candidate directly into F without even counting its support, and also avoid generating any of its subsets as candidates.

Figure 6:
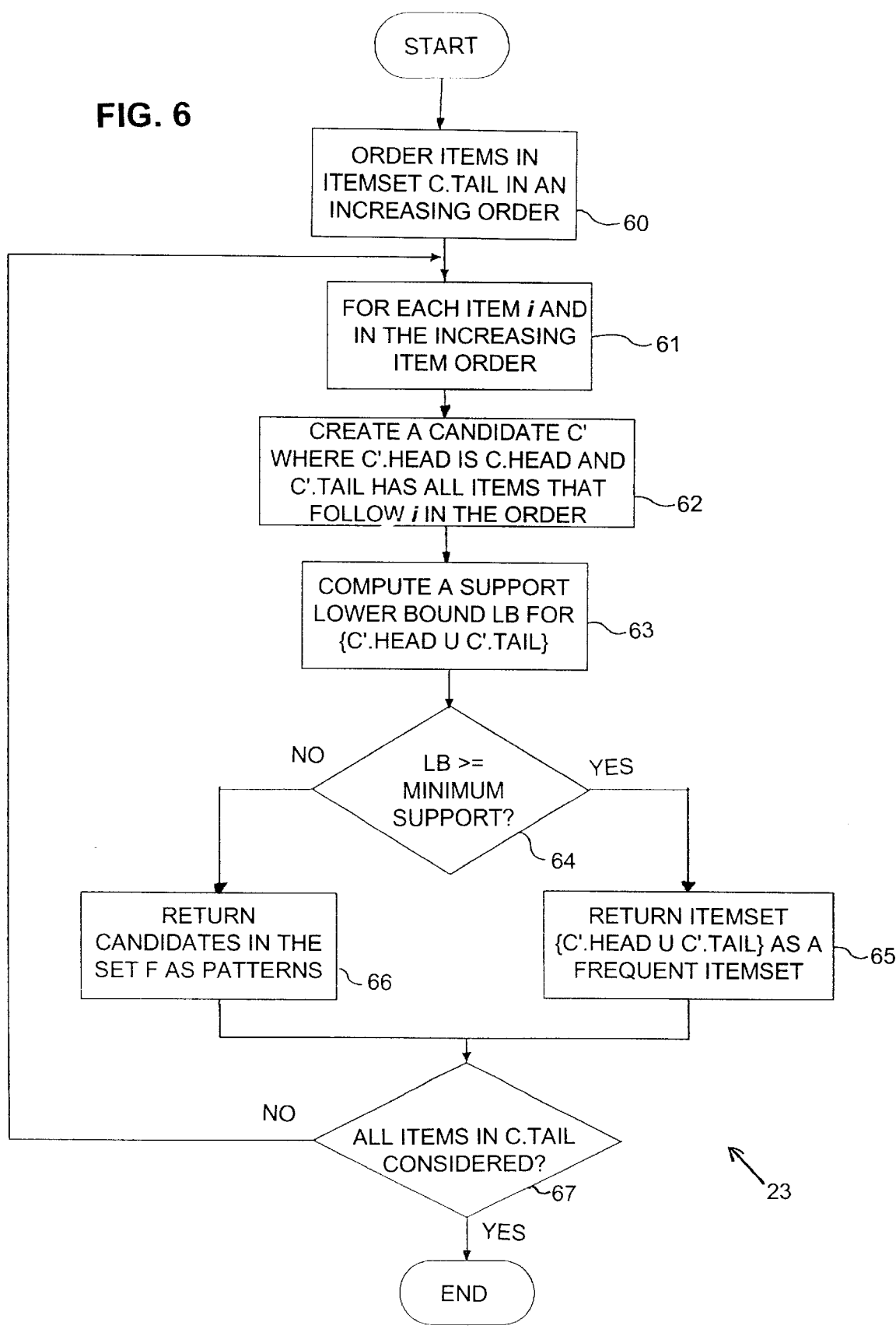
FIG. 6 is a flowchart representing a preferred embodiment of the sequence of generating new candidates.

A typical embodiment of the new candidate generation (step 23 of FIG. 2) with modifications required for the item reordering and support lower-bounding optimizations, is shown in FIG. 6 in flowchart form. The Generate-New-Candidates operation now returns as soon as it finds a candidate c' that is frequent according to the support lower-bound provided by the Compute-Lower-Bound function. This is because candidates that would otherwise be generated are proper subsets of c', and hence will also be frequent. At step 60, the items in the c.tail itemset of a candidate c are ordered. For each item i of c.tail and in an increasing order (step 61), a candidate c' is created where c'.head is the itemset c.head and c'.tail includes all the items the follow i in the order (step 62). At step 63, a support lower-bound for the set {c'.head $\cup$ c'.tail} is computed. This lower-bound is compared to a minimum support in step 64. If it is equal to or greater than the minimum support, the itemset {c'.head $\cup$ c.tail} is returned as a frequent itemset (step 65), otherwise, the candidates in the set F are returned as the desired patterns (step 66). The process reiterates for each item i in the set c.tail, as shown by the negative branch from block 67.

FIGS. 7–8 show the pseudo-code for two preferred embodiments of the new candidate generation, one without support lower-bounding and one with support lower-building. FIG. 9 is the pseudo-code for a preferred embodiment of the Compute-Lower-Bound function referred to in FIG. 8, for computing a lower-bound on the support of a candidate.

Figure 10:
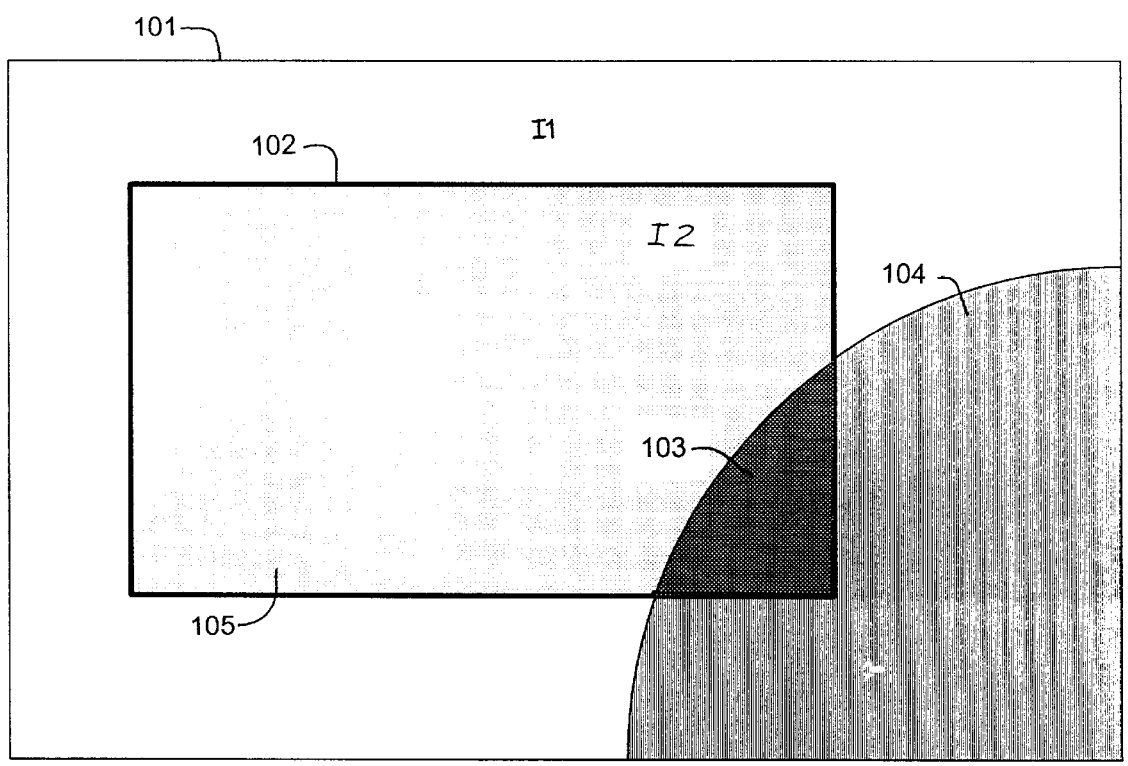
FIG. 10 illustrates the support drop resulting from extending itemsets with an item i.
Figure 11A:
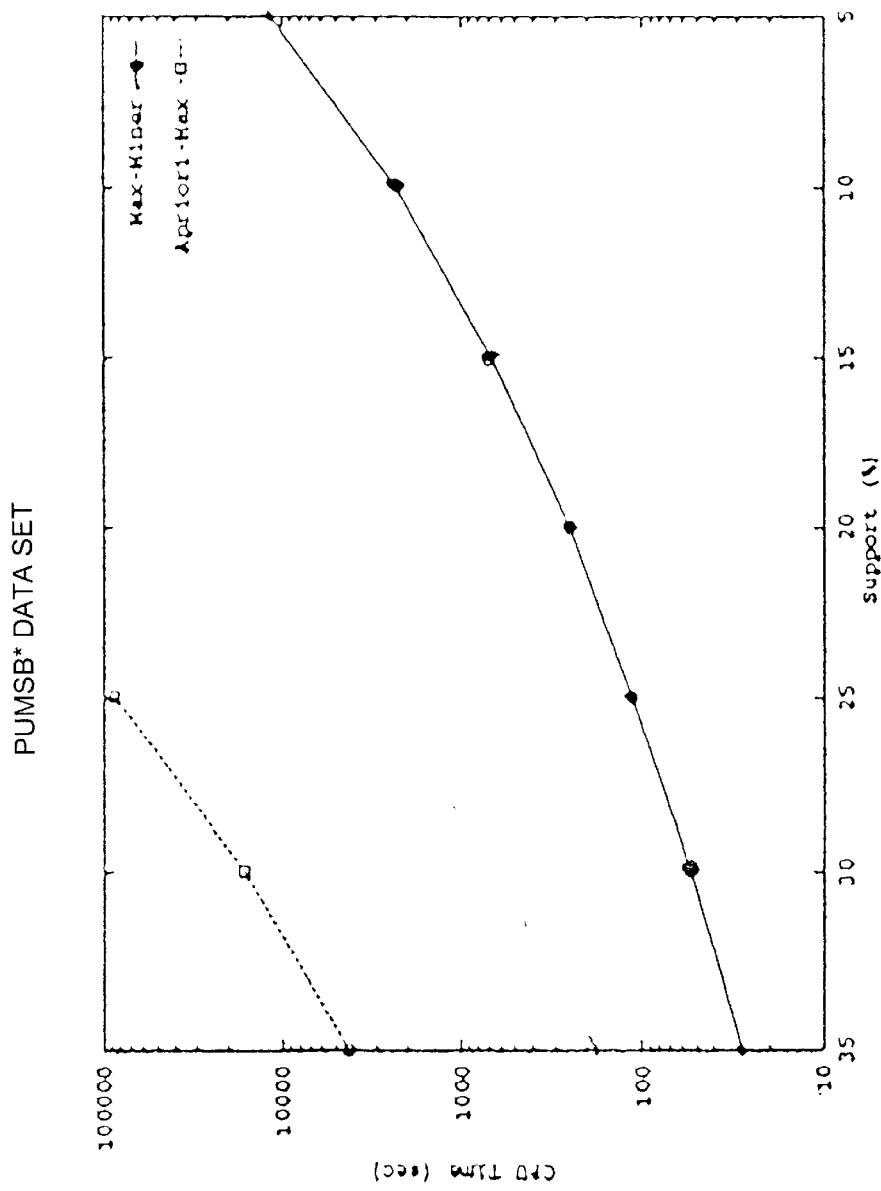
FIGS. 11a–11d show a comparison of the performance of Max-Miner to Apriori-Max on several evaluation data sets.
Figure 11B:
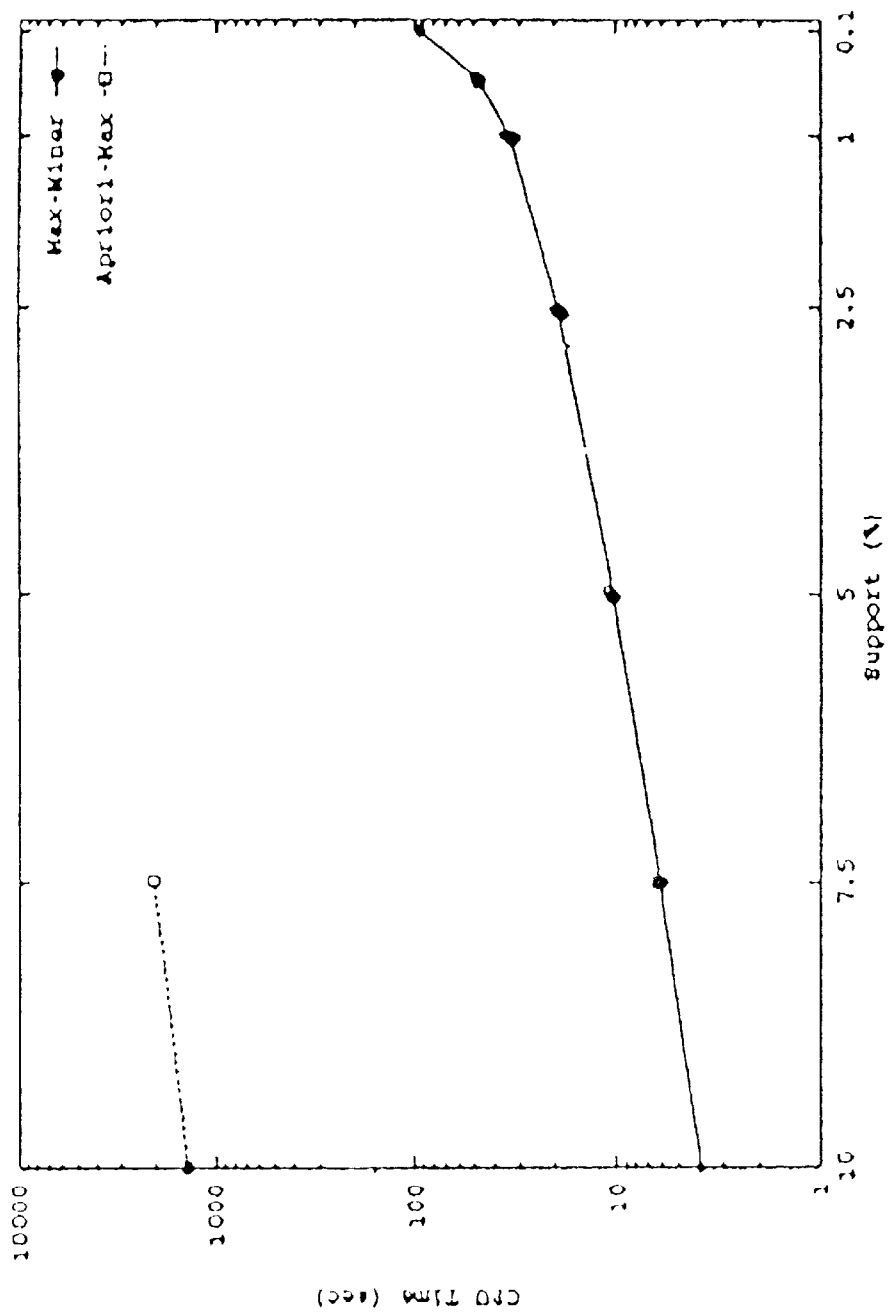
Figure 11C:
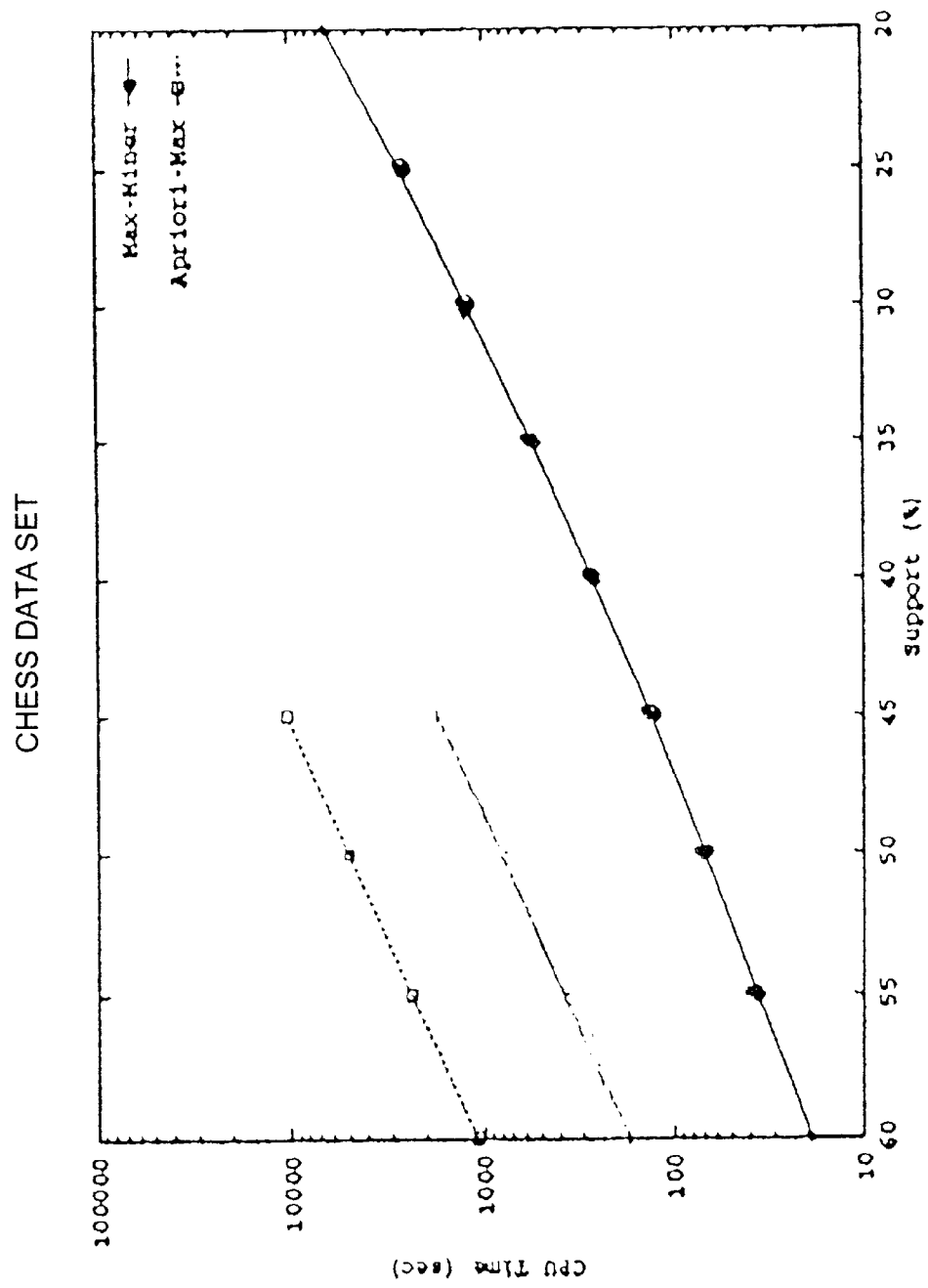
Figure 11D:
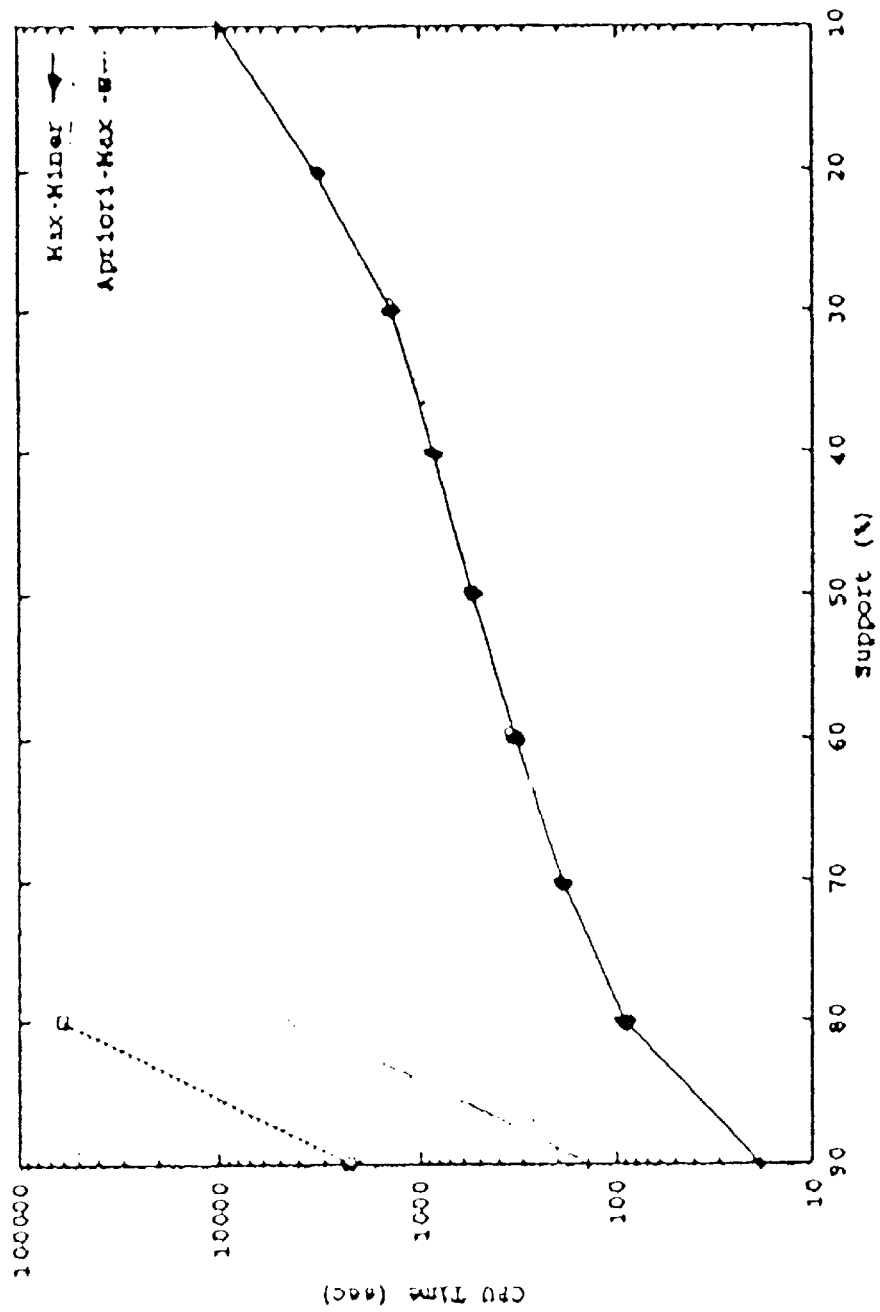

FIG. 10 illustrates the support drop resulting from extending itemsets $I_2$ and I, with item i. In FIG. 10, drop (I,i)=sup (I)–sup(I$\cup$ {i}), where i is an item not in itemset I, and sup(I) denotes the support of itemset I. The drop function, as defined above, computes an upper-bound on the amount of support drop that results from adding item i to any itemset that is a superset I. This operation is described formally as follows. Sup($I_1$)-drop($I_2$, i) is a lower-bound on the support of itemset $I_1$ $\cup$ {i} when $I_1$ is a proper suspect of $I_2$. In FIG. 10, the outer square 101 represents the space of all transactions supporting itemset $I_2$. The supporting space of itemset $I_1$ is represented by the inner square 102. Extending each of these itemsets with the item i causes the space of transactions supported by each to drop. Because the space occupied by $I_1$ is entirely contained within the space occupied by $I_2$, the set of transactions dropped by extending itemset $I_1$ with i (area 103) must be a subset of the transactions dropped by extending itemset $I_2$ with i (area 104). The drop function therefore provides an upper-bound on the support drop of extending $I_2$ with item i, so substrating this drop from the support of $I_1$ provides a lower-bound on the support of $I_1$ $\cup$ {i} (area 105).

After generating a new candidate c' from candidate c, Max-Miner knows the support of c'. head and the support of every itemset c.head $\cup$ {i} where i is in c'.tail. Since c'.head is a proper superset of c.head, Max-Miner can use the above lower-bounding operation to lower-bound the support of c' by totaling up the support drop resulting from extending c'.head with every item in c'.tail. This net support drop is then subtracted from the support of c'.head.

3. Generating the Initial Set of Candidates

The final optimization in the preferred embodiment of Max-Miner is for generating initial candidates from $F_2$ (the set of frequent 2-itemsets) instead of $F_1$. During the database pass performed by Max-Miner immediately after generating intial candidates, the method is effectively computing $F_2$. Though Max-Miner is also computing the support of the longer itemsets formed by combining the head with all tail items, only occasionally will these candidates turn up frequent during this database pass in practice. Thus, counting the support of these longer itemsets offers little benefit.

To generate candidates from the itemset $F_2$ instead of $R_1$, initial candidates, as previously described for the basic Max-Miner method, are first created. Next, a new set of candidates is generated using the Generate-New-Candidates function, treating all of the initial candidates as infrequent, and using $F_2$ to identify the infrequent and frequent tail items. The itemset $F_2$ is then used again to identify and remove some infrequent tail items in this new set of candidates before returning.

4. Data Structures

The data structures used by Max-Miner preferably includes enhancements for efficiently counting candidate supports. The primary data structure is a hash tree which provides a quick lookup of all subsets of a given itemset that have been stored in the tree. Candidate itemsets are placed in the hash tree, and each transaction is used to look up those candidates whose support needs to be incremented. Max-Miner indexes a candidate using only the items in its head. For each transaction, it uses the hash tree to quickly look up all candidates whose head itemset appears in the transaction. Then, for each candidate identified, the method traverses down the tail items one by one, incrementing the corresponding support if the item is present in the transaction. Max-Miner requires only one record of the data set at a time to be in memory and scales roughly linearly in the size of the database. It also uses hash-trees for fast removal of candidates and itemsets that have proper supersets in F.

Imposing Additional Constraints on Minded Patterns

Though the frequent patterns themselves are often of interest to the end-user, oftentimes they need to be processed further before being presented. Association rules are frequent itemsets that can be useful for prediction. The CONFIDENCE of an association rule $i_1, i_2, \ldots, i_k \rightarrow i_c$ is equal to the support of the itemset $\{i_1, i_2, \ldots, i_k\}$ divided by the support of the itemset $\{i_1, i_2, \ldots, i_k, i_c\}$. Typically, the user is interested in finding only those association rules with high confidence and support, and these are produced by searching the entire space of frequent itemsets. Another database pass would therefore be required after finding all maximal frequent patterns in order to obtain the supports of all frequent patterns. If the maximal patterns are long, this step might take a long time to complete, even if efficient and specialized data structures are used.

Max-Miner can be used to identify many, though not all, high-confidence rules during its execution. After counting the support of a candiate c, Max-Miner has all the supports necessary to compute the confidence of all association rules of the form c.head$\rightarrow i_c$ where $i_c \in$ c.tail. Interestingly, the heuristic item-reordering process described above is not only effective for improving Max-Miner's performance, but it also focuses Max-Miner on a search space that is rich in high-confidence rules by positioning low-support items leftmost in the item ordering. Another approach at incomplete rule-mining could be to use the set of maximal frequent itemsets to define the space of rules searched by a randomized process.

Though these association rule mining methods may be effective, completeness is often a requirement. Incorporating additional constraints into the search for frequent patterns is probably the only way to achieve completeness on complex data. Confidence-bounds and rule-structure constraints can be used to prune itemsets from consideration that cannot possibly participate in high confidence rules. Other constraints that are often easily specified by an end-user to simplify the problem include item constraints, information-theoretic constraints, and any of the multitude of rule-interestingness measures that have been proposed in the literature.

Using the above described Max-Miner method, additional contraints can often be easily integrated into the search. Consider as an example the problem of finding only the longest patterns. This constraint is quite powerful. Data sets with long patterns often have many maximal frequent patterns of which only a small fraction are longest. After each database pass, Max-Miner can employ this constraint by finding the size of the longest itemset in the set of longest frequent itemsets F and pruning all sets in F and all candidates in c that are shorter. This method is referred to as Max-Miner-LO (for longest only). Its correctness can be established from the correctness of Max-Miner and the fact that only candidates shorter than the longest frequent patterns are ever pruned. A version of Max-Miner that incorporates simple item constraints can be similarly defined.

Performance Evaluation

Data sets from several domains were selected for evaluating the performance of the Max-Miner method. Most are publicly available over the web. The data set that is not publicly available is from a retailer, which has records listing all of the items purchased by a customer over a period of time. Another data set was created from PUMS census data available on the World Wide Web at http://agustus.csscr.washington.edu/census/comp_013.html. Continuous attributes of the data records were discretized, and the attributes corresponding to status flags were removed. One version of the data set were produced where all items with 80% or greater support were discarded. This particular data set in its raw form consists of both housing and person records, but only the person records were extracted. The remaining data sets were taken from the Irvine Machine Learning Database Repository (available on the World Wide Web at http://www.ics.uci.edu/~mlearn/MLRepository.html), which contains several data sets commonly used to benchmark machine learning algorithms.

The chosen data sets consist of entirely discrete-valued records, with those having a relatively wide record length and a substantial number of records being favored. These data sets include Splice, Mushroom, Connect-4, and Chess. The Splice data set contains DNA data, the Mushroom database contains records describing the characteristics of various mushroom species, and Connect-4 and Chess data sets are compiled from game state information. Table 2 lists the width and height of each of these data sets. Pumsb* is the same data set as Pumsb minus all items with 80% or more support.

TABLE 2

| Data set | No. of Records | Average Record Width |
| --- | --- | --- |
| Chess | 3,196 | 37 |
| Connect-4 | 67,557 | 43 |
| Mushroom | 8,124 | 23 |
| Pumsb | 49,046 | 74 |
| Pumsb* | 49.046 | 50 |
| Retail | 213,972 | 31 |
| Splice | 3,174 | 61 |

The data set with the longest patterns was Pumsb. This data set also had the most maximal frequent patterns—intractably many even at relatively high levels of support. Data set Pumsb* is used for evaluating Max-Miner, while Pumsb is only used to evaluate Max-Miner-LO. Pumsb*, even though items with 80% or more support are removed, is still a difficult data set with long frequent patterns.

All measurements were made on implementations of the method of the invention and Apriori on a lightly loaded 200MHz Power-PC with 256 megabytes of RAM. The methods were implemented in C++ atop the same optimized hash-tree implementation. To better utilize memory, Apriori was made to discard any itemset as soon as it is determined to be (or not to be) maximal frequent and it is no longer needed to generate the next set of candidates. This version of Apriori is referred to as "Apriori-Max" since it is tuned to find only maximal frequent itemsets.

FIGS. 11a–11d show a comparison of the performance of Max-Miner with Apriori-Max using several evaluation data sets. FIGS. 11a–11d correspond to the data sets Pumbs, Mushroom, Chess, and Connect-4, respectively. At several data points, the Max-Miner method is over two orders of magnitude faster than Apriori at identifying maximal frequent patterns. If Apriori-Max were used to perform candidate paging, the speedups at lower supports would be even more substantial. Even though these data sets are from distinctly different domains, the performance trends are all identical. What these data sets all have in common are long patterns at relatively high values of support.

Figure 12A:
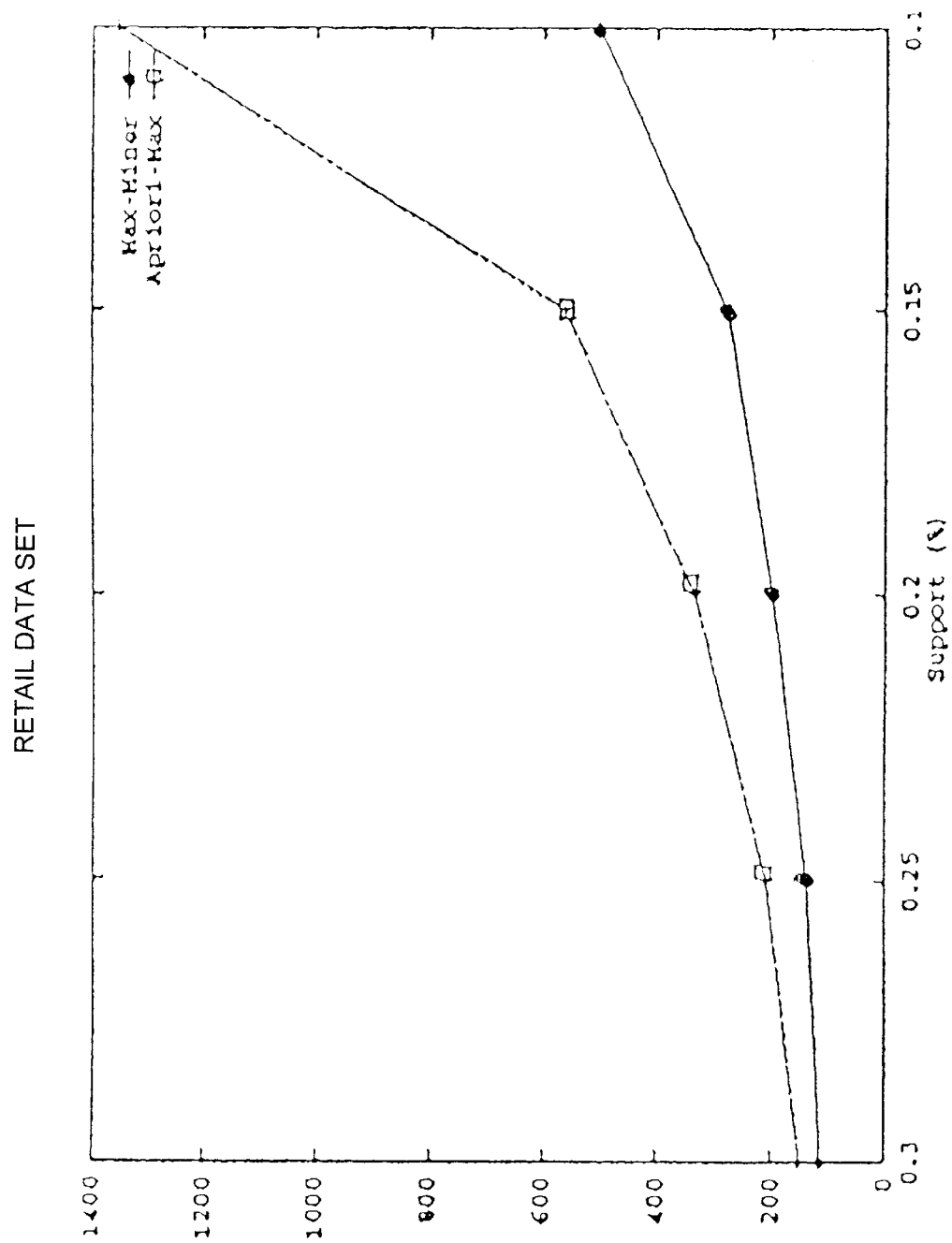
FIGS. 12a–12b represent the runtime (CPU time) on small-pattern data sets of Retail and Splice, respectively, as plotted against the pattern support.
Figure 12B:
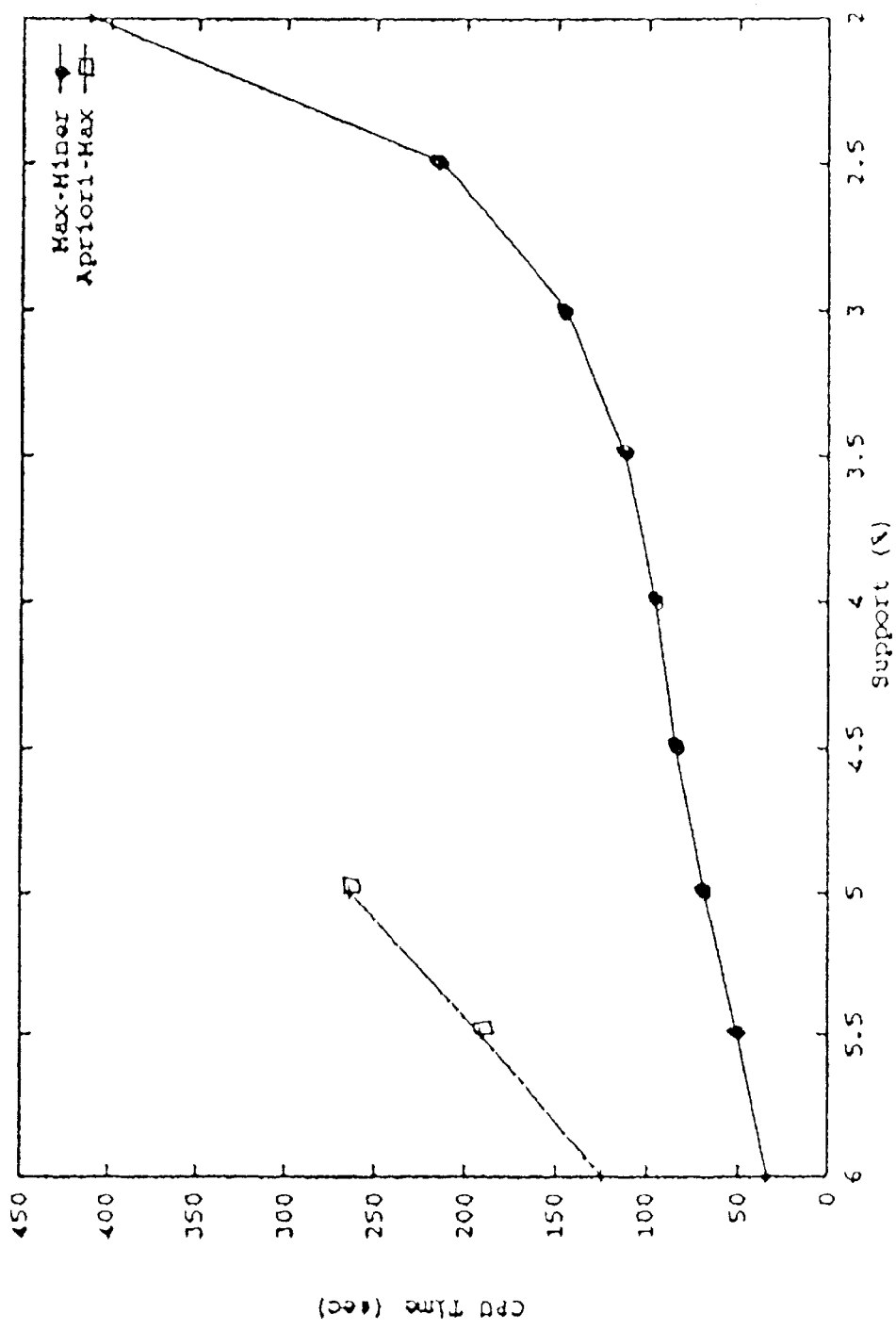

FIGS. 12a and 12b show the runtime (CPU time) on small-pattern data sets of retail and splice, respectively, as plotted against the pattern support. Only the performance of Apriori-Max on these data sets is plotted. The two remaining evaluation data sets, Retail and Splice, have comparatively small patterns at low support levels. Even so, Max-Miner still outperforms Apriori. Most of the maximal frequent itemsets in these data sets are of length 2–4, and the longest are of length 8 in splice and 6 in retail at the lowest support values.

Scaling Considerations

Figure 13:
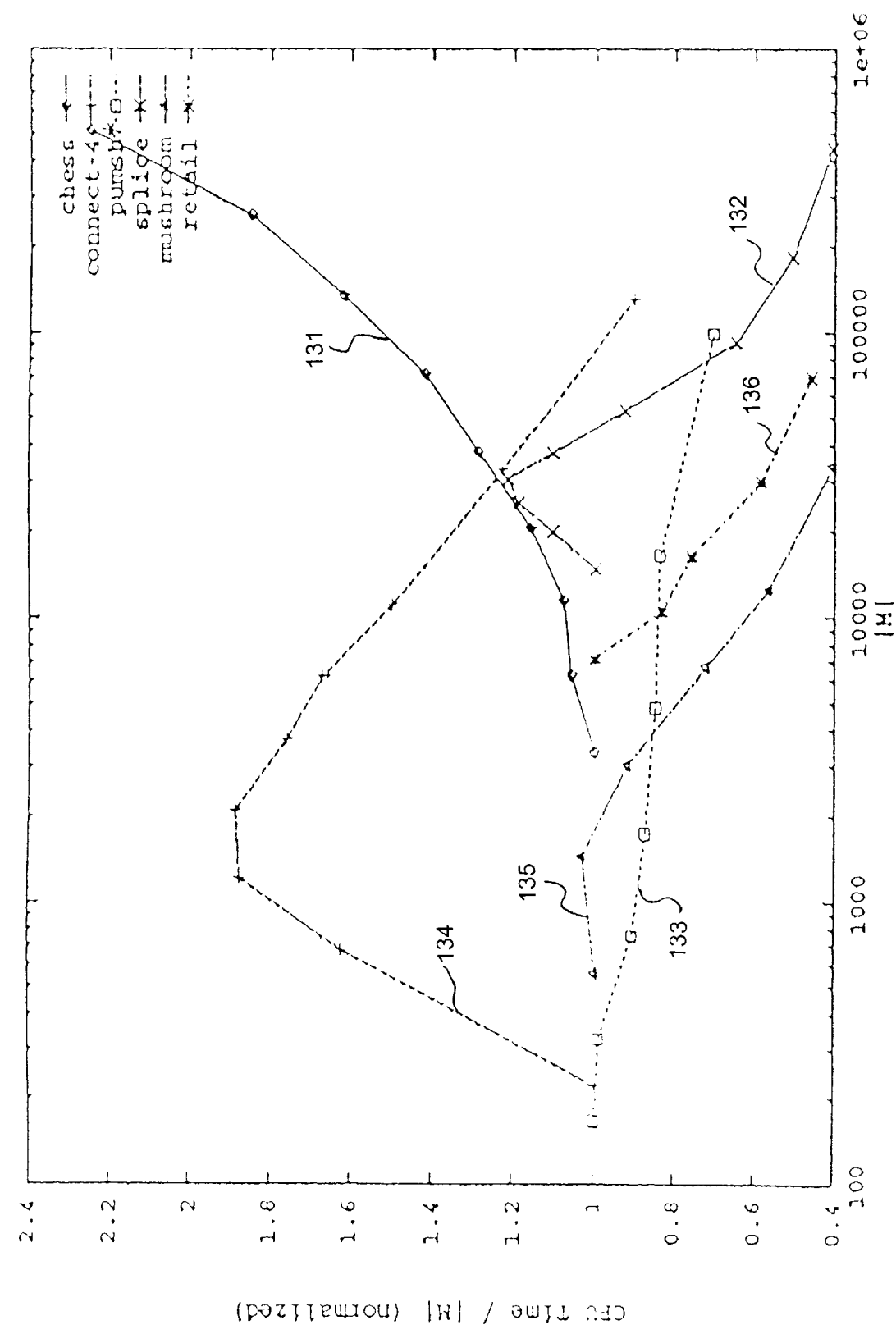
FIG. 13 shows the time spent by the method of the invention (Max-Miner) per maximal frequent itemset versus the number of found maximal frequent itemsets.

For every examined data set at the support levels, the lower the support, the more maximal-frequent patterns were found. FIG. 13 illustrates the amount of time (CPU time) spent by Max-Miner per maximal frequent itemset against the number of maximal frequent itemsets found during a given run of the method. The support values used to generate this data are the same ones that appear in FIGS. 12a–b. Lines 131–136 in FIG. 13 correspond to the data sets Chess, Connect-4, Pumbs*, Splice, Mushroom, and Retail, respectively. Max-Miner's performance per maximal frequent itemset remains relatively constant as the number of maximal frequent itemsets increases, even though the size of the longest patterns varies significantly. For instance, for the Pumsb* data set, the left-most point of line 133 arises from a run at 35% support where the longest patterns contain 15 items. The right-most point is for a run at 5% support where the longest patterns contain 40 items. Even so, the performance per maximal frequent itemset varies no more than 25%, indicating that Max-Miner is scaling roughly linearly with the number of maximal frequent itemsets.

The Chess data set (line 131) exhibits the most non-linear increase in difficulty with the number of maximal frequent itemsets, though this increase is still relatively subdued (within a factor of 2.5) considering the large increase in the number of maximal patterns and their length. It is possible that the line 131 for the Chess data set would begin to decrease had even lower levels of support were used. The other data sets all begin to get easier as the number of maximal frequent patterns increases beyond some point. This is certainly in part due to the fact that itemsets with lower support incur less overhead since they are contained by fewer database transactions. However, as support decreases, maximal frequent itemsets become longer, which leads to an increase in storage and hash-tree lookup overhead.

Figure 14:
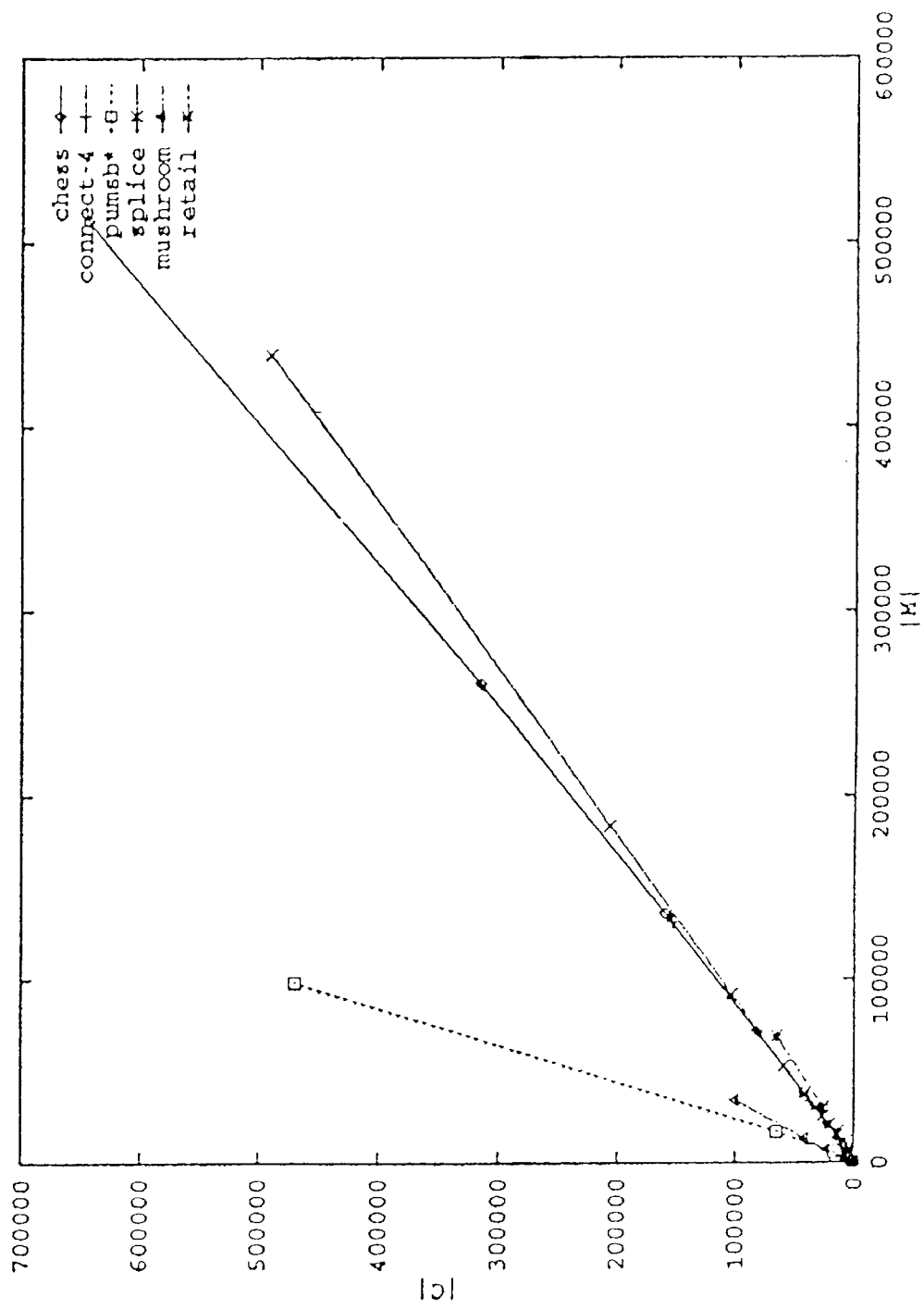
FIG. 14 shows a comparison between the number of candidates whose support was counted during a given run of the Max-Miner method and the number of maximal frequent sets identified.

To remove the effect of hash-tree lookup and support-counting overhead on runtime scaling, and to demonstrate how Max-Miner scales in its space consumption, the number of candidates whose support was counted during a given run of the method is compared to the number of maximal frequent sets identified. FIG. 14 illustrates this comparison. The vertical and horizontal axes represent the number of candidates and the number of identified maximals, respectively. For every data set, there is a strong linear relationship. In fact, the number of candidates considered is always within a small (at most 3.7 on Pumsb*) constant of the number of maximal frequent itemsets.

Figure 15:
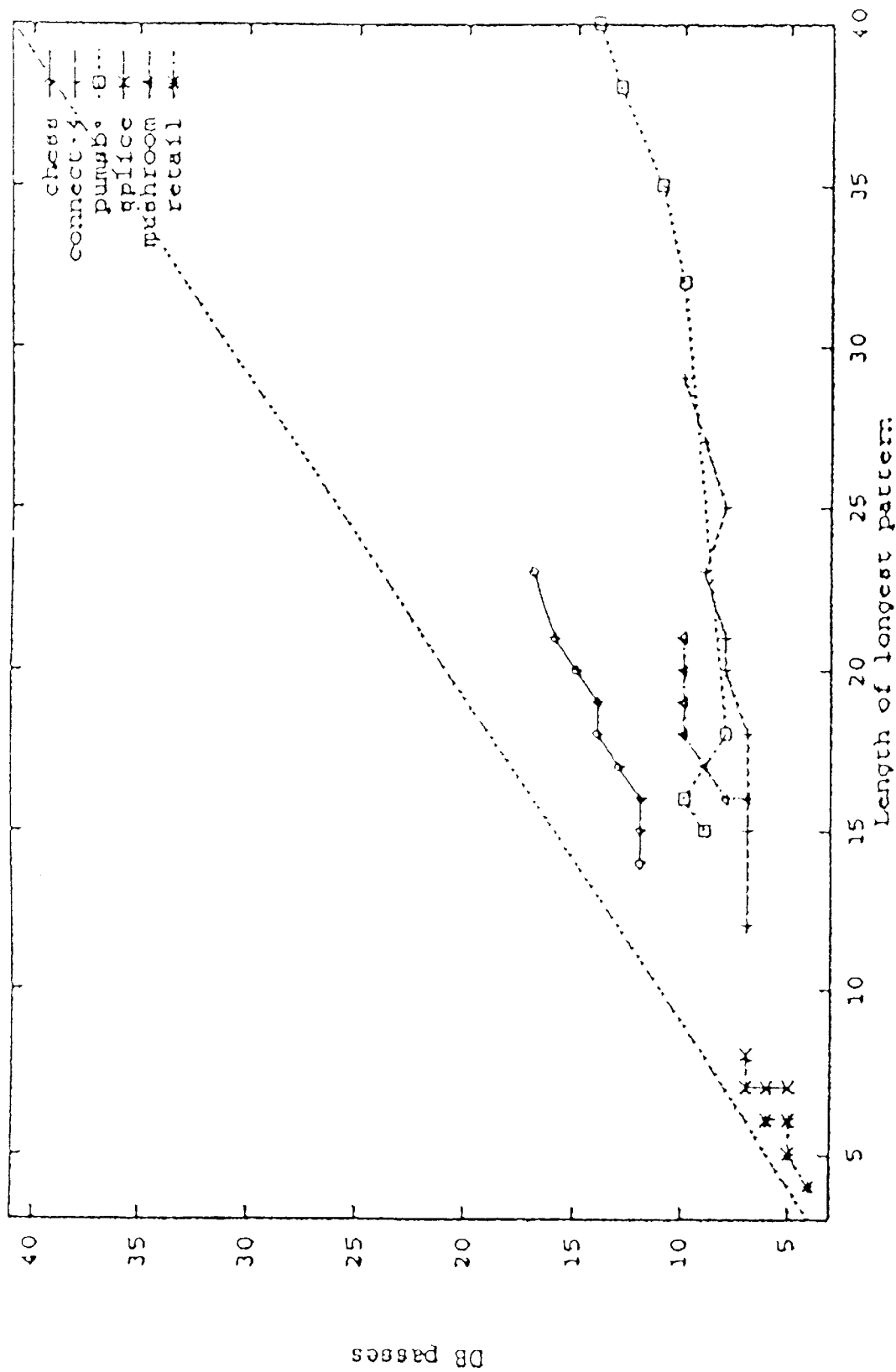
FIG. 15 is a graph of the number of database passes performed by Max-Miner against the length of the longest patterns identified, using different support values.

FIG. 15 is a plotting of the number of database passes performed by Max-Miner against the length of the longest patterns identified during each of the many runs at different support values. The worst-case number of passes is represented by the diagonal. Note that while database passes steadily increase with longer patterns, the number increases nowhere near as fast as the worst-case bound suggests.

Some experiments were run to illustrate the necessity of the two main optimizations of Max-Miner, as previously described. Support lower-bounding was found to be beneficial only on the data sets with long patterns. For instance, on the Chess data set, after turning off the lower-bounding optimization, performance dropped by over four-fold at all levels of support dur to a four-fold increase in the number of candidates to be counted. On the retail data set, the optimization's effect were negligible. Item-reordering was beneficial, usually dramatically so, on every data set considered. For example, at 80% support on the Chess data set, turning off item ordering (which caused the algorithm to default to a static lexicographic item ordering) resulted in an order of magnitude decrease in performance, with the performance gap widening even further as support was decreased.

Figure 16:
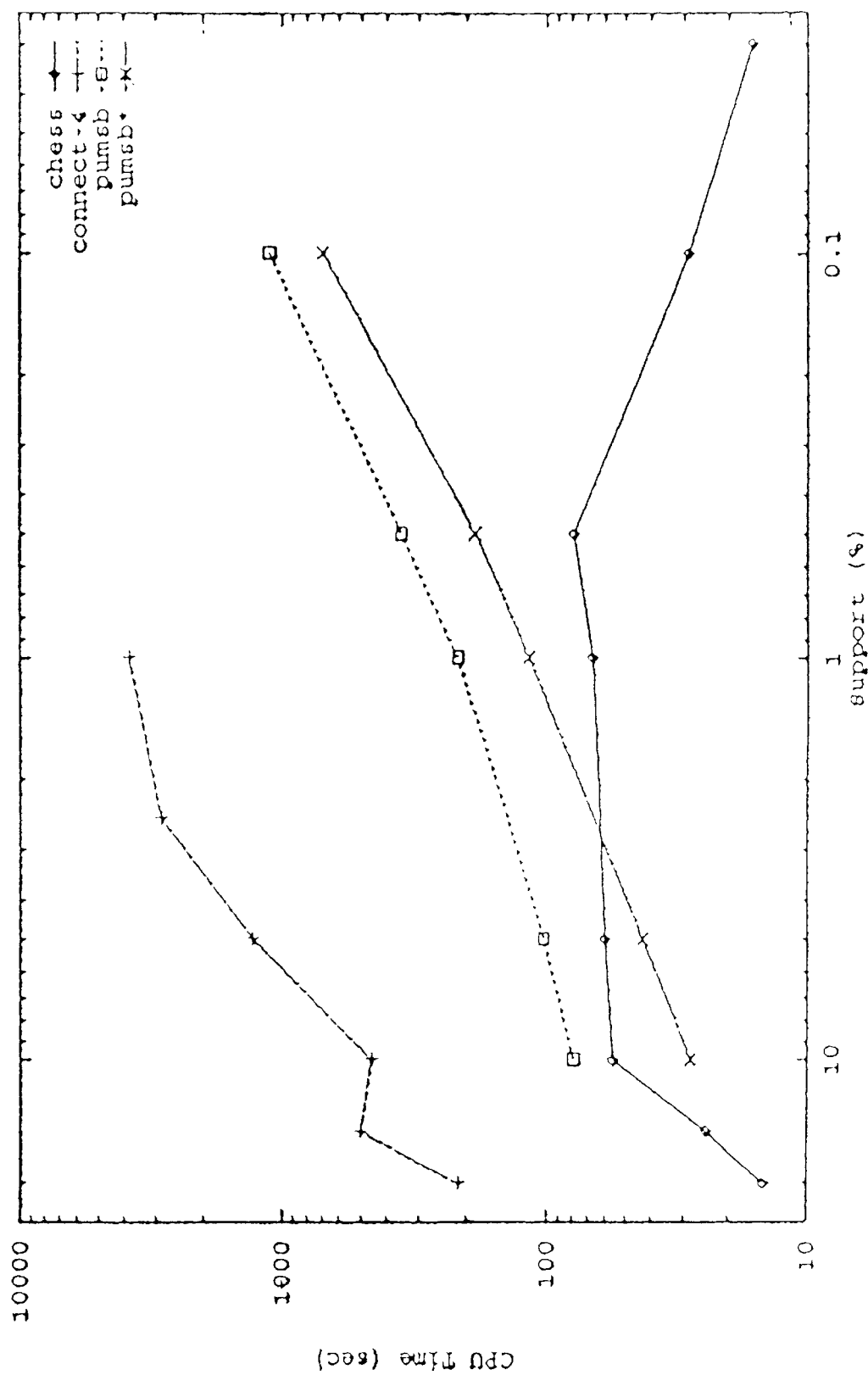
FIG. 16 shows the runtime of the Max-Miner method on the data sets with the longest patterns, in which additional constraints are used when the number of maximal frequent patterns is very large.

FIG. 16 shows the runtime of Max-Miner-LO method on the data sets with the longest patterns. Very low support values were chosen for these runs to illustrate how additional constraints can make mining feasible even when the number of maximal frequent patterns is very large. Note that here the Pumsb data set could be mined without removing items appearing in 80% or more of the records. The longest patterns in Pumsb at .1% support contain 72 items. Patterns were very long even at 10% support where they contained 61 items. For most of these data points, the number of longest patterns was under 300.

In summary, a method for finding frequent-pattern, referred to as Max-Miner, has been described. Max-Miner abandons the exponentail time and space-consuming level-wise search employed by Apriori-like methods. It is based upon several novel techniques including a look-ahead scheme for quickly identifying long patterns that is not limited to the initialization phase, a heuristic item-ordering policy for tightly focusing the search, and a support-lower-bounding scheme that is also applicable to other algorithms. The result is orders of magnitude in performance improvements on long-pattern data sets, and more modest though still substantial improvements when patterns are short. Max-Miner is also easily extendible to incorporate additional constraints on the set of frequent patterns to identified. Incorporating these constraints into the search is the only way to achieve tractable completeness as low supports on complex data sets. Given the wide variety of interestingness constraints, all or many of them may be incorporated into a frequent-pattern search rather than being applied only as a post-processing filtering step on the space of all frequent patterns.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A method for identifying patterns from a database of records, each record having a plurality of items, the method comprising the steps of:

a) generating an initial set C of candidates, each candidate c having itemsets c.head and c.tail where c.head and c.tail are disjoint sets of items;

b) determining a support for each candidate in the set C, the support of a candidate being the number of records containing the candidate;

c) extracting frequent candidates from the set C and entering them into a set F, the frequent candidates being those whose set {c.head ∪ c.tail} is an itemset having a minimum support;

d) generating new candidates from non-frequent candidates of C using a lower-bounding of candidate support, the new candidates being added to the set C of candidates;

e) removing from the sets C and F any candidates that have a superset in F;

f) repeating steps (b–e) until the set C of candidates is empty; and g) returning the candidates from the set F as the patterns.

2. The method as recited in claim 1, wherein the step of generating an initial set C of candidates includes the steps of:

determining a set $F_1$ of frequent itemsets where each frequent itemset includes exactly one item, the frequent itemsets being those with a minimum support;

ordering the items in $F_1$ in terms of an increasing order of support; and for each item i in $F_1$ other than the last item in the order:
  i) creating a new candidate with ({i} as c.head and all other items following i in the order as c.tail; and
  ii) adding the new candidate to the set C.

3. The method as recited in claim 1, wherein the step of generating new candidates includes the steps, for each non-frequent candidate c, of:

ordering the items in the set c.tail of c in an increasing order of support; and for each item i in the set c.tail of c and in the increasing item order:
  i) creating a candidate c′ where c′.head is c.head ∪ {i} and c′.tail includes all items that follow i in the order; and
  ii) if the set c′.tail is empty, then returning the set c′.head as a frequent itemset, otherwise, adding the candidate c′ to the set C.

4. The method as recited in claim 1, wherein the step of generating new candidates includes the steps, for each non-frequent candidate c, of:

ordering the items in the set c.tail of c in an increasing order of support; and for each item i in the set c.tail and in the increasing item order:
  i) creating a candidate c′ where c′.head is c.head ∪ {i} and c′.tail includes all items that follow i in the order;
  ii) computing a support lower bound for the itemset {c′.head ∪ c′.tail}; and
  iii) if the lower bound is equal to or greater than the minimum support, then returning the itemset {c′.head ∪ c′.tail} as a frequent itemset, otherwise, adding the candidate c′ to the set C.

5. The method as recited in claim 4, wherein the step of computing a lower bound includes the steps, for each item j in the set c′.tail, of:

extending the set c.head l with the item j; and computing an upper bound of support drop resulting from adding the item j to any itemset that is a superset of the set l.

6. The method as recited in claim 5, further comprising the steps of:

calculating S as a sum of the support drops resulting from extending the set c′.head with every item in the set c′.tail;

returning $(S_{c'} - S)$ as the lower bound of the support of the itemset {c′.head ∪ c′.tail} where $S_{c'}$ is the support of c′.head.

7. The method as recited in claim 1, wherein the step of determining a support includes, for each candidate c in C, counting the support of itemset {c.head ∪ c.tail} and of all itemsets {c.head ∪ {i}} such that i ∈ c.tail.

8. The method as recited in claim 1, wherein in determining a support, a hash tree data structure is used for looking up all subsets of a given itemset that have been stored in the hash tree.

9. The method as recited in claim 8, further comprising the steps of:

storing the candidates in the hash tree where the candidates are indexed using the items in the c.head sets;

for each record in the database, traversing the hash tree to look up all candidates whose set c.head appears in the record; and for each candidate identified, traversing the tail items of the candidate and incrementing the support of each item that appears in the record by one.

10. The method as recited in claim 1, wherein the patterns satisfy a predetermined constraint.

11. The method as recited in claim 10, wherein the constraint is to find only the longest patterns.

12. A computer program product for use with a computer system for identifying patterns from a database of records, each record having a plurality of items, the program product comprising:

a recording medium;

means, recorded on the recording medium, for directing the system to generate an initial set C of candidates, each candidate c having itemsets c.head and c.tail where c.head and c.tail are disjoint sets of items;

means, recorded on the recording medium, for directing the system to determine a support for each candidate in the set C, the support of a candidate being the number of records containing the candidate;

means, recorded on the recording medium, for directing the system to extract frequent candidates from the set C and entering them into a set F, the frequent candidates being those whose set {c.head ∪ c.tail} is an itemset having a minimum support;

means, recorded on the recording medium, for directing the system to generate new candidates from non-frequent candidates of C using a lower-bounding of candidate support, the new candidates being added to the set C of candidates;

means, recorded on the recording medium, for directing the system to remove from the sets C and F any candidates that have a superset in F;

means, recorded on the recording medium, for directing the system to repeat the system operation until the set C of candidates is empty; and means, recorded on the recording medium, for directing the system to return the candidates from the set F as the patterns.

13. The computer program product as recited in claim 12, wherein the means for directing to generate an initial set C of candidates includes:

means, recorded on the recording medium, for directing the system to determine a set $F_1$ of frequent itemsets where each frequent itemset includes exactly one item, the frequent itemsets being those with a minimum support;

means, recorded on the recording medium, for directing the system to order the items in $F_1$ in terms of an increasing order of support; and for each item i in $F_1$ other than the last item in the order:
  i) means, recorded on the recording medium, for directing the system to create a new candidate with {i} as c.head and all other items following i in the order as c.tail; and
  ii) means, recorded on the recording medium, for directing the system to add the new candidate to the set C.

14. The computer program product as recited in claim 12, wherein the means for directing to generate new candidates includes, for each non-frequent candidate c:
  means, recorded on the recording medium, for directing the system to order the items in the set c.tail of c in an increasing order of support; and
    for each item i in the set c.tail of c and in the increasing item order:
      i) means, recorded on the recording medium, for directing the system to create a candidate c' where c'.head is c.head ∪ {i} and c'.tail includes all items that follow i in the order; and
      ii) means, recorded on the recording medium, for directing the system to return the set c' head as a frequent itemset if the set c'.tail is empty, otherwise, to add the candidate c' to the set C.

15. The computer program product as recited in claim 12, wherein the means for directing to generate new candidates includes, for each non-frequent candidate c:
  means, recorded on the recording medium, for directing the system to order the items in the set c.tail of c in an increasing order of support; and
    for each item i in the set c.tail and in the increasing item order:
      i) means, recorded on the recording medium, for directing the system to create a candidate c' where c'.head is c.head ∪ {i} and c'.tail includes all items that follow i in the order;
      ii) means, recorded on the recording medium, for directing the system to compute a support lower bound for the itemset {c'.head ∪ c'.tail}; and
      iii) means, recorded on the recording medium, for directing the system to return the itemset {c'.head ∪ c'.tail} as a frequent itemset if the lower bound is equal to or greater than the minimum support, otherwise, to add the candidate c' to the set C.

16. The computer program product as recited in claim 15, wherein the means for directing to compute a lower bound includes, for each item j in the set c'.tail:
  means, recorded on the recording medium, for directing the system to extend the set c.head l with the item j; and
  means, recorded on the recording medium, for directing the system to compute an upper bound of support drop resulting from adding the item j to any itemset that is a superset of the set l.

17. The computer program product as recited in claim 16, further comprising:
  means, recorded on the recording medium, for directing the system to calculate S as a sum of the support drops resulting from extending the set c'.head with every item in the set c'.tail;
  means, recorded on the recording medium, for directing the system to return $(S_{c'}-S)$ as the lower bound of the support of the itemset {c'.head ∪ c'.tail} where $S_{c'}$ is the support of c'.head.

18. The computer program product as recited in claim 12, wherein the means for directing to determine a support includes, for each candidate c in C, means, recorded on the recording medium, for directing the system to count the support of itemset {c.head ∪ c.tail} and of all itemsets {c.head ∪ {i}} such that i ∈ c.tail.

19. The computer program product as recited in claim 12, wherein in determining a support, a hash tree data structure is used for looking up all subsets of a given itemset that have been stored in the hash tree.

20. The computer program product as recited in claim 19, further comprising:
  means, recorded on the recording medium, for directing the system to store the candidates in the hash tree where the candidates are indexed using the items in the c.head sets;
  for each record in the database, means, recorded on the recording medium, for directing the system to traverse the hash tree to look up all candidates whose set c.head appears in the record; and
  for each candidate identified, means, recorded on the recording medium, for directing the system to traverse the tail items of the candidate and increment the support of each item that appears in the record by one.

21. The computer program product as recited in claim 12, wherein the patterns satisfy a predetermined constraint.

22. The computer program product as recited in claim 21, wherein the constraint is to find only the longest patterns.

23. A system for identifying patterns from a database of records, each record having a plurality of items, the system comprising:
  a) means for generating an initial set C of candidates, each candidate c having itemsets c.head and c.tail where c.head and c.tail are disjoint sets of items;
  b) means for determining a support for each candidate in the set C, the support of a candidate being the number of records containing the candidate;
  c) means for extracting frequent candidates from the set C and entering them into a set F, the frequent candidates being those whose set {c.head ∪ c.tail} is an itemset having a minimum support;
  d) means for generating new candidates from non-frequent candidates of C using a lower-bounding of candidate support, the new candidates being added to the set C of candidates;
  e) means for removing from the sets C and F any candidates that have a superset in F;
  f) means for repeating the system operation until the set C of candidates is empty; and
  g) means for returning the candidates from the set F as the patterns.

24. The system as recited in claim 23, wherein the means for generating an initial set C of candidates includes:
  means for determining a set $F_1$ of frequent itemsets where each frequent itemset includes exactly one item, the frequent itemsets being those with a minimum support;
  means for ordering the items in $F_1$ in terms of an increasing order of support; and
  for each item i in $F_1$ other than the last item in the order:
    i) means for creating a new candidate with {i} as c.head and all other items following i in the order as c.tail; and
    ii) means for adding the new candidate to the set C.

25. The system as recited in claim 23, wherein the means for generating new candidates includes, for each non-frequent candidate c, of:
  means for ordering the items in the set c.tail of c in an increasing order of support; and for each item i in the set c.tail of c and in the increasing item order:
  i) means for creating a candidate c' where c' head is c.head ∪ {i} and c'.tail includes all items that follow i in the order; and
  ii) if the set c'.tail is empty, then means for returning the set c' head as a frequent itemset, otherwise, means for adding the candidate c' to the set C.

26. The system as recited in claim 23, wherein the means for generating new candidates includes, for each non-frequent candidate c:
  means for ordering the items in the set c.tail of c in an increasing order of support; and
  for each item i in the set c.tail and in the increasing item order:
    i) means for creating a candidate c' where c'.head is c.head ∪ {i} and c'.tail includes all items that follow i in the order;
    ii) means for computing a support lower bound for the itemset {c'.head ∪ c'.tail}; and
    iii) if the lower bound is equal to or greater than the minimum support, then means for returning the itemset {c'.head ∪ c'.tail} as a frequent itemset, otherwise, means for adding the candidate c' to the set C.

27. The system as recited in claim 26, wherein the means for computing a lower bound includes, for each item j in the set c'.tail:
  means for extending the set c.head l with the item j; and
  means for computing an upper bound of support drop resulting from adding the item j to any itemset that is a superset of the set l.

28. The system as recited in claim 27, further comprising:
  means for calculating S as a sum of the support drops resulting from extending the set c'.head with every item in the set c'.tail;
  means for returning $(S_{c'}-S)$ as the lower bound of the support of the itemset {c'.head ∪ c'.tail} where $S_{c'}$ is the support of c'.head.

29. The system as recited in claim 23, wherein means for determining a support includes, for each candidate c in C, means for counting the support of itemset {c.head ∪ c.tail} and of all itemsets {c.head ∪ {i}} such that i ∈ c.tail.

30. The system as recited in claim 23, wherein the means for determining a support uses a hash tree data structure for looking up all subsets of a given itemset that have been stored in the hash tree.

31. The system as recited in claim 30, further comprising:
  means for storing the candidates in the hash tree where the candidates are indexed using the items in the c.head sets;
  for each record in the database, means for traversing the tree to look up all candidates whose set c.head appears in the record; and
  for each candidate identified, means for traversing the tail items of the candidate and for incrementing the support of each item that appears in the record by one.

32. The system as recited in claim 23, wherein the patterns satisfy a predetermined constraint.

33. The system as recited in claim 32, wherein the constraint is to find only the longest patterns.

* * * * *